(12) United States Patent
Maniwa et al.

(10) Patent No.: US 11,960,023 B2
(45) Date of Patent: Apr. 16, 2024

(54) RADAR DEVICE

(71) Applicant: Mitsubishi Electric Corporation, Tokyo (JP)

(72) Inventors: Kazuaki Maniwa, Tokyo (JP); Satoshi Kageme, Tokyo (JP); Teruyuki Hara, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 936 days.

(21) Appl. No.: 16/934,947

(22) Filed: Jul. 21, 2020

(65) Prior Publication Data
US 2020/0348407 A1 Nov. 5, 2020

Related U.S. Application Data

(63) Continuation of application No. PCT/JP2018/004892, filed on Feb. 13, 2018.

(51) Int. Cl.
| | |
|---|---|
| *G01S 7/02* | (2006.01) |
| *G01S 7/282* | (2006.01) |
| *G01S 13/06* | (2006.01) |
| *G01S 13/58* | (2006.01) |
| *G01S 13/26* | (2006.01) |
| *G01S 13/87* | (2006.01) |

(52) U.S. Cl.
CPC ............ *G01S 7/023* (2013.01); *G01S 7/0232* (2021.05); *G01S 7/0233* (2021.05); *G01S 7/282* (2013.01); *G01S 13/06* (2013.01); *G01S 13/581* (2013.01); *G01S 13/26* (2013.01); *G01S 13/878* (2013.01)

(58) Field of Classification Search
USPC .......................................................... 702/143
See application file for complete search history.

(56) References Cited

U.S. PATENT DOCUMENTS

| | | | |
|---|---|---|---|
| 2017/0276769 A1* | 9/2017 | Kishigami | ............ G01S 7/0234 |
| 2019/0079177 A1* | 3/2019 | Lee | .......... G01S 13/48 |
| 2019/0339374 A1 | 11/2019 | Kageme et al. | |
| 2020/0011983 A1* | 1/2020 | Kageme | ............... G01S 13/325 |

FOREIGN PATENT DOCUMENTS

| | | |
|---|---|---|
| EP | 3 187 894 A1 | 7/2017 |
| JP | 2012-145332 A | 8/2012 |
| JP | 2013-88313 A | 5/2013 |

(Continued)

OTHER PUBLICATIONS

International Search Report, issued in PCT/JP2018/004892, dated Mar. 20, 2018.

(Continued)

*Primary Examiner* — Paul D Lee
(74) *Attorney, Agent, or Firm* — BIRCH, STEWART, KOLASCH & BIRCH, LLP

(57) ABSTRACT

A radar device is configured in such a manner that each of transmission radars uses, as the amount of phase modulation, a value determined from either one of a positive integer value that is less than or equal to a result of division obtained by dividing the number of hits of a transmission RF signal by the number of the transmission radars and a value of 0; a hit number h of the transmission RF signal; and the number of hits.

8 Claims, 26 Drawing Sheets

(56) References Cited

FOREIGN PATENT DOCUMENTS

WO    WO 2017/149596 A1    9/2017

OTHER PUBLICATIONS

Japanese Office Action issued in Japanese Patent Application No. 2018-536513, dated Aug. 21, 2018.
Yu et al., "Quadrature Slow-Time MIMO Radar with Experimental Results," in 2010 Conference Record of the Forty Fourth Asilomar Conference on Signals, Systems and Computers, IEEE, pp. 2134-2137.
European Search Report issued in European Patent Application No. 18 906 523.8 dated Mar. 15, 2021.

\* cited by examiner

RADAR DEVICE

CROSS REFERENCE TO RELATED APPLICATION

This application is a Continuation of PCT International Application No. PCT/JP2018/004892, filed on Feb. 13, 2018, which is hereby expressly incorporated by reference into the present application.

TECHNICAL FIELD

The invention relates to a radar device that detects a candidate for a target.

BACKGROUND ART

The following Non-Patent Literature 1 discloses a radar device that receives each of a plurality of transmission radio-frequency signals (hereinafter, referred to as "transmission RF signals") reflected by a target, as a reception radio-frequency signal (hereinafter, referred to as "reception RF signal"), and detects a candidate for the target on the basis of the reception RF signals.

The radar device includes a plurality of transmission radars, a reception radar, and a signal processor.

The plurality of transmission radars generate a plurality of transmission RF signals by performing phase modulation on pulse signals with the same transmission frequency, using the amounts of phase modulation which vary between the transmission radars and vary between hit numbers.

The plurality of transmission radars radiate each of the generated plurality of transmission RF signals into the air toward a target.

The reception radar receives, as a reception RF signal, each of the plurality of transmission RF signals having been transmitted from each of the plurality of transmission radars, and then reflected by the target.

The signal processor demodulates each of the reception RF signals using the amounts of phase modulation used by the plurality of transmission radars.

The signal processor coherently integrates each of the demodulated reception RF signals.

CITATION LIST

Non-Patent Literature

Non-Patent Literature 1: Jason Yu and Jeffrey Krolik, "Quadrature Slow-Time MIMO Radar with Experimental Results," in 2010 Conference Record of the Forty Fourth Asilomar Conference on Signals, Systems and Computers, 2134-2137

SUMMARY OF INVENTION

Technical Problem

A signal generated by integrating each of demodulated signals of reception RF signals by the conventional radar device includes signals with the same waveform whose number corresponds to the number of the transmission radars in a frequency range not including aliased Doppler frequency.

Therefore, the conventional radar device cannot use the entire frequency range not including aliased Doppler frequency, as a frequency range used to detect a candidate target.

Since the frequency range that can be used by the conventional radar device to detect a candidate target is limited to a range obtained by dividing the frequency range not including aliased Doppler frequency by the number of the transmission radars, there is a problem that it is difficult to detect a candidate target and the like that moves at the high velocity.

The invention is made to solve a problem such as that described above, and an object of the invention is to obtain a radar device capable of using the entire frequency range not including aliased Doppler frequency, as a frequency range used to detect a candidate target.

Solution to Problem

A radar device according to the invention includes a plurality of transmission radars for transmitting transmission radio-frequency signals by performing phase modulation on pulse signals with a same transmission frequency, using amounts of phase modulation, the transmission radio-frequency signals being the phase-modulated pulse signals, and the amounts of phase modulation varying between hit numbers; a reception radar for receiving, as a reception radio-frequency signal, each of the transmission radio-frequency signals having been transmitted from each of the plurality of transmission radars, and then reflected by a target; and a signal processor for detecting a candidate for the target on the basis of the reception radio-frequency signal received by the reception radar, and each of the plurality of transmission radars uses, as a corresponding one of the amounts of phase modulation, a value determined from either one of a positive integer value that is less than or equal to a result of division and a value of 0; a hit number; and the number of hits of a corresponding one of the transmission radio-frequency signals, the result of division being obtained by dividing the number of hits by the number of the plurality of transmission radars, the value using different amounts of the phase modulation satisfying a formula below.

$$\Delta\varphi(n_{TX}, h) = 2\pi \frac{p(n_{TX})}{H} h$$

$$\left(p(n_{TX}) \in \left\{0, 1, \ldots, \text{floor}\left(\frac{H}{N_{TX}}\right)\right\}\right),$$

where $\Delta\varphi(n_{TX}, h)$ is amounts of the phase modulation, H is the number of hits, h is the hit number, $N_{TX}$ is the number of transmission radars.

Advantageous Effects of Invention

According to the invention, the radar device is configured in such a manner that each of the plurality of transmission radars uses, as the amount of phase modulation, a value determined from either one of a positive integer value that is less than or equal to a result of division obtained by dividing the number of hits of a transmission radio-frequency signal by the number of the plurality of transmission radars and a value of 0; a hit number; and the number of hits, the value using different amounts of the phase modulation satisfying a formula below.

$$\Delta\varphi(n_{TX}, h) = 2\pi \frac{p(n_{TX})}{H} h$$

$$\left( p(n_{TX}) \in \left\{ 0, 1, \ldots, \text{floor}\left(\frac{H}{N_{TX}}\right) \right\} \right),$$

where $\Delta \varphi(n_{TX}, h)$ is amounts of the phase modulation, H is the number of hits, h is the hit number, $N_{TX}$ is the number of transmission radars. Therefore, the radar device according to the invention can use the entire frequency range not including aliased Doppler frequency, as a frequency range used to detect a candidate target.

BRIEF DESCRIPTION OF DRAWINGS

FIG. 6 is a hardware configuration diagram of a computer in the case where each of the signal processing unit 7-1 and the signal processor 8 is implemented by software, firmware, or the like;

DESCRIPTION OF EMBODIMENTS

To describe the invention in more detail, modes for carrying out the invention will be described below with reference to the accompanying drawings.

First Embodiment

Figure 1:
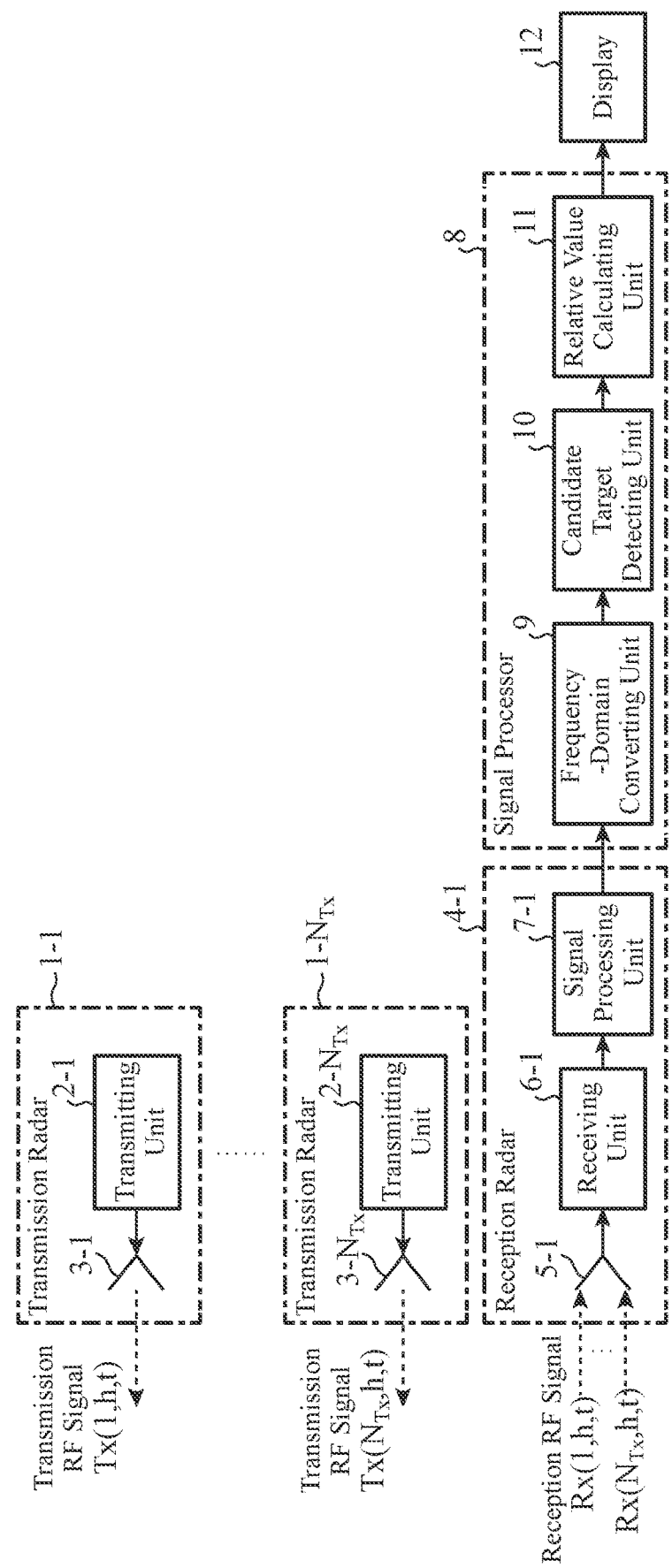
FIG. 1 is a configuration diagram showing a radar device of a first embodiment.

FIG. 1 is a configuration diagram showing a radar device of a first embodiment.

Figure 2:
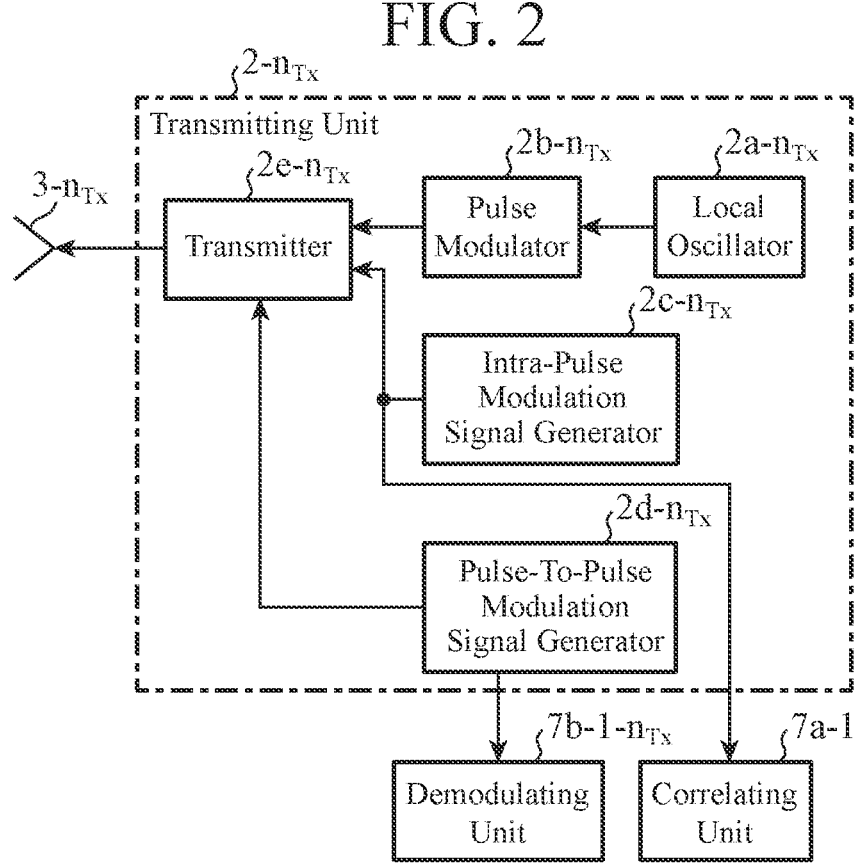
FIG. 2 is a configuration diagram showing a transmitting unit 2-$n_{Tx}$ of a transmission radar 1-$n_{Tx}$ in the radar device of the first embodiment.

FIG. 2 is a configuration diagram showing a transmitting unit $2\text{-}n_{Tx}$ of a transmission radar $1\text{-}n_{Tx}$ in the radar device of the first embodiment.

Figure 3:
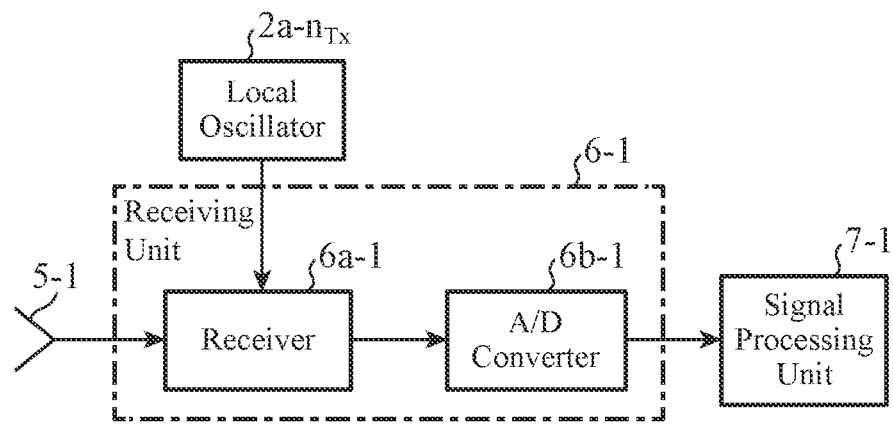
FIG. 3 is a configuration diagram showing a receiving unit 6-1 of a reception radar 4-1 in the radar device of the first embodiment.

FIG. 3 is a configuration diagram showing a receiving unit 6-1 of a reception radar 4-1 in the radar device of the first embodiment.

Figure 4:
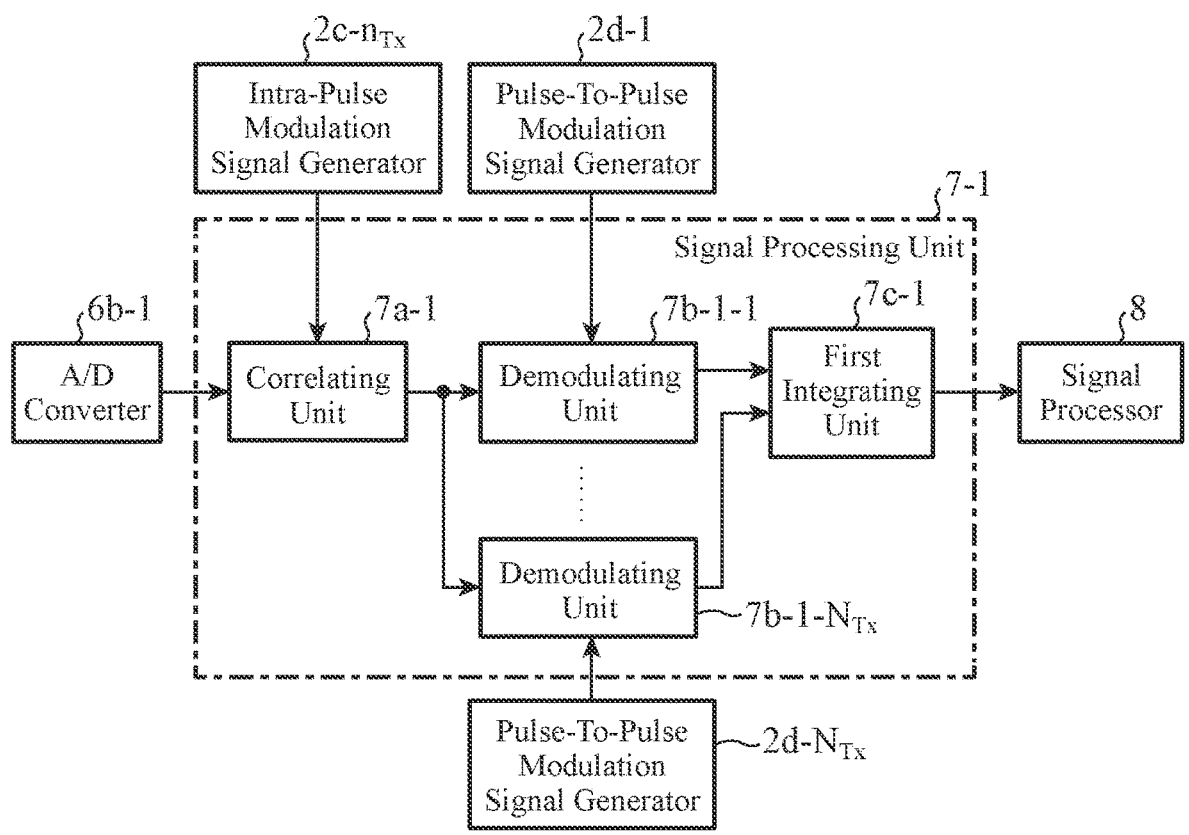
FIG. 4 is a configuration diagram showing a signal processing unit 7-1 of the reception radar 4-1 in the radar device of the first embodiment.

FIG. 4 is a configuration diagram showing a signal processing unit 7-1 of the reception radar 4-1 in the radar device of the first embodiment.

Figure 5:
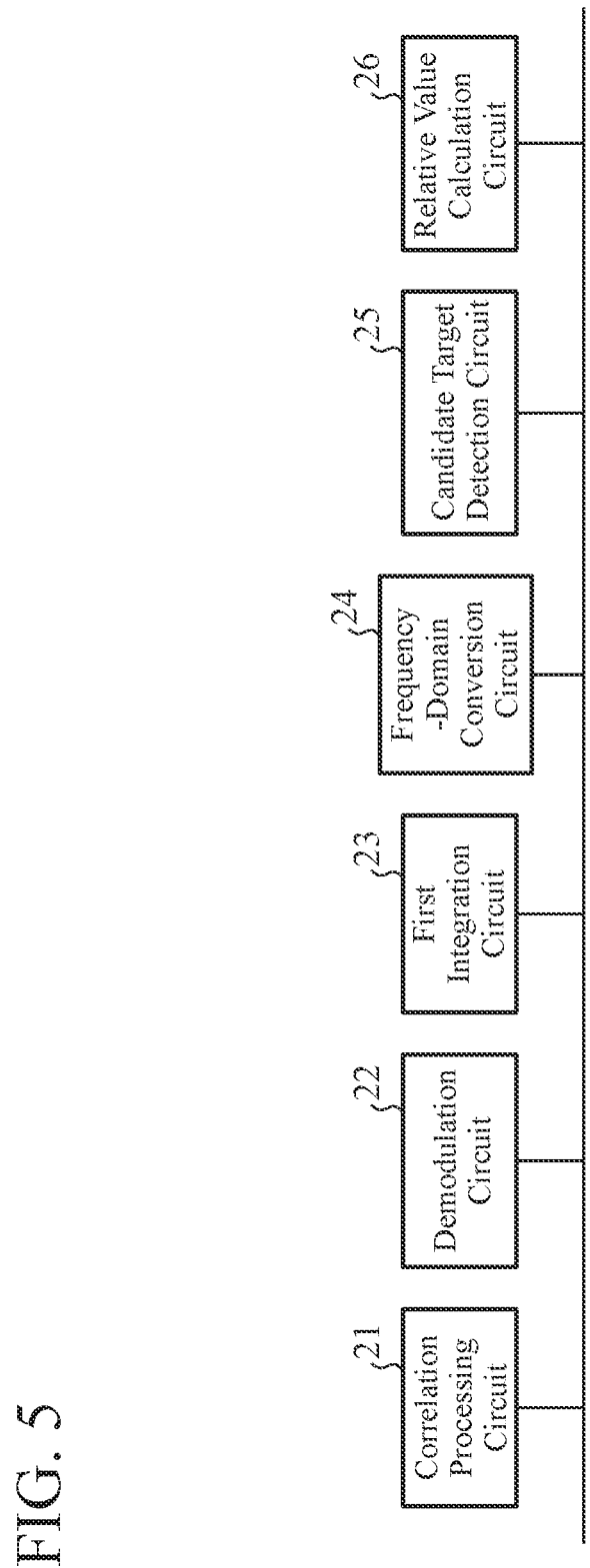
FIG. 5 is a hardware configuration diagram showing the signal processing unit 7-1 and a signal processor 8.

FIG. 5 is a hardware configuration diagram showing the signal processing unit 7-1 and a signal processor 8.

In FIGS. 1 to 5, the radar device includes transmission radars 1-1 to $1\text{-}N_{Tx}$, the reception radar 4-1, the signal processor 8, and a display 12.

The transmission radars $1\text{-}n_{Tx}$ ($n_{Tx}=1, 2, \ldots, N_{Tx}$) perform phase modulation on pulse signals $L_{pls}$(h, t) with the same transmission frequency, using the amounts of phase modulation which vary between hit numbers.

Each transmission radar $1\text{-}n_{Tx}$ performs phase modulation on a pulse signal $L_{pls}$(h, t) and thereby generates a transmission radio-frequency signal (hereinafter referred to as "transmission RF signal $\text{Tx}(n_{Tx}, h, t)$") which is the phase-modulated pulse signal.

The transmission radar $1\text{-}n_{Tx}$ transmits the transmission RF signal $\text{Tx}(n_{Tx}, h, t)$ to a target. A variable h is a variable representing the hit number of the transmission RF signal $\text{Tx}(n_{Tx}, h, t)$ and a variable t is a variable representing time.

The transmission radar $1\text{-}n_{Tx}$ includes a transmitting unit $2\text{-}n_{Tx}$ and an antenna $3\text{-}n_{Tx}$.

The transmitting unit $2\text{-}n_{Tx}$ includes a local oscillator $2a\text{-}n_{Tx}$, a pulse modulator $2b\text{-}n_{Tx}$, an intra-pulse modulation signal generator $2c\text{-}n_{Tx}$, a pulse-to-pulse modulation signal generator $2d\text{-}n_{Tx}$, and a transmitter $2e\text{-}n_{Tx}$.

The local oscillator $2a\text{-}n_{Tx}$ generates a local oscillation signal $L_0(t)$ and outputs the local oscillation signal $L_0(t)$ to each of the pulse modulator $2b\text{-}n_{Tx}$ and a receiver 6a-1.

In the pulse modulator $2b\text{-}n_{Tx}$, each of a pulse repetition interval $T_{pri}$ and a pulse width $T_0$ is set beforehand. Each of the pulse repetition interval $T_{pri}$ and the pulse width $T_0$ may be manually set by a user or may be set by a control device which is not shown.

The pulse modulator $2b\text{-}n_{Tx}$ performs pulse modulation on the local oscillation signal $L_0(t)$ outputted from the local oscillator $2a\text{-}n_{Tx}$, and thereby repeatedly generates a pulse signal $L_{pls}$(h, t) with the pulse width $T_0$ and the pulse repetition interval $T_{pri}$.

The pulse modulator $2b\text{-}n_{Tx}$ outputs the pulse signal $L_{pls}$(h, t) to the transmitter $2e\text{-}n_{Tx}$.

The intra-pulse modulation signal generator $2c\text{-}n_{Tx}$ generates an intra-pulse modulation signal $L_{chp}$(h, t) for performing frequency modulation on the pulse signal $L_{pls}$(h, t), using a frequency modulation bandwidth B(h).

The intra-pulse modulation signal generator $2c\text{-}n_{Tx}$ outputs the intra-pulse modulation signal $L_{chp}$(h, t) to each of the transmitter $2e\text{-}n_{Tx}$ and a correlating unit 7a-1.

The pulse-to-pulse modulation signal generator $2d\text{-}n_{Tx}$ generates a pulse-to-pulse modulation signal $L_{hit}(n_{Tx}, h)$ for performing phase modulation on the pulse signals $L_{pls}$(h, t), using the amount of phase modulation $\Delta\phi(n_{Tx}, h)$ which varies between hit numbers h.

The amount of phase modulation $\Delta\phi(n_{Tx}, h)$ is a value determined from either one of a positive integer value that is less than or equal to a result of division obtained by dividing the number of hits H of the transmission RF signal $\text{Tx}(n_{Tx}, h, t)$ by the number $N_{Tx}$ of the transmission radars 1-1 to $1\text{-}N_{Tx}$ and a value of 0; the hit number h; and the number of hits H.

The pulse-to-pulse modulation signal generator $2d\text{-}n_{Tx}$ outputs the pulse-to-pulse modulation signal $L_{hit}(n_{Tx}, h)$ to each of the transmitter $2e\text{-}n_{Tx}$ and a demodulating unit $7b\text{-}1\text{-}n_{Tx}$.

The transmitter $2e\text{-}n_{Tx}$ multiplies the pulse signal $L_{pls}$(h, t) by the intra-pulse modulation signal $L_{chp}$(h, t) and the pulse-to-pulse modulation signal $L_{hit}(n_{Tx}, h)$, and thereby generates a transmission RF signal $\text{Tx}(n_{Tx}, h, t)$ for the hit number h.

The transmitter $2e\text{-}n_{Tx}$ outputs the transmission RF signal $\text{Tx}(n_{Tx}, h, t)$ to the antenna $3\text{-}n_{Tx}$.

The antenna $3\text{-}n_{Tx}$ radiates the transmission RF signal $\text{Tx}(n_{Tx}, h, t)$ outputted from the transmitter $2e\text{-}n_{Tx}$ into the air.

Antennas 3-1 to $3\text{-}N_{Tx}$ are to be arranged in a distributed manner, and a plurality of antenna elements may be arranged in a distributed manner as the antennas 3-1 to $3\text{-}N_{Tx}$. Therefore, an array antenna that performs Digital Beam Forming (DBF), etc., can also be used as the antennas 3-1 to $3\text{-}N_{Tx}$.

The reception radar 4-1 receives each of the transmission RF signals Tx(1, h, t) to $\text{Tx}(N_{Tx}, h, t)$ having been transmitted from the transmission radars 1-1 to $1\text{-}N_{Tx}$, respectively, and then reflected by a target, as a reception radio-frequency signal (hereinafter, referred to as "reception RF signal $\text{Rx}(n_{Rx}, h, t)$"). In an example of FIG. 1, $n_{Rx}=1$.

The reception radar 4-1 includes an antenna 5-1, the receiving unit 6-1, and the signal processing unit 7-1.

The antenna 5-1 receives the reception RF signal $\text{Rx}(n_{Rx}, h, t)$ entering the antenna 5-1, and outputs the reception RF signal $\text{Rx}(n_{Rx}, h, t)$ to the receiving unit 6-1.

The receiving unit 6-1 includes the receiver 6a-1 and an analog/digital converter (hereinafter referred to as "A/D converter 6b-1").

The receiving unit 6-1 performs a reception process on the reception RF signal $\text{Rx}(n_{Rx}, h, t)$ outputted from the antenna 5-1.

The receiver 6a-1 downconverts the frequency of the reception RF signal $\text{Rx}(n_{Rx}, h, t)$ outputted from the antenna 5-1, using a local oscillation signal $L_0(t)$ outputted from a local oscillator $2a\text{-}n_{Tx}$. Although the radar device shown in FIG. 1 includes $N_{Tx}$ local oscillators, since the $N_{Tx}$ local oscillators output the same local oscillation signal $L_0(t)$, the receiver 6a-1 may use a local oscillation signal $L_0(t)$ outputted from any local oscillator.

In addition, the receiver 6a-1 performs, for example, a process of removing noise included in the reception RF signal $Rx(n_{Rx}, h, t)$ whose frequency has been downconverted, using a band-pass filter.

The receiver 6a-1 amplifies the reception RF signal having passed through the band-pass filter, and then performs a phase detection process on the reception RF signal, and thereby generates a reception video signal $V'(n_{Rx}, h, t)$.

The receiver 6a-1 outputs the reception video signal $V'(n_{Rx}, h, t)$ to the A/D converter 6b-1.

The A/D converter 6b-1 converts the reception video signal $V'(n_{Rx}, h, t)$ outputted from the receiver 6a-1 from an analog signal to a digital signal.

The A/D converter 6b-1 outputs a reception video signal $V(n_{Rx}, h, m)$ which is the digital signal to the signal processing unit 7-1.

The signal processing unit 7-1 includes the correlating unit 7a-1, demodulating units 7b-1-1 to 7b-1-$N_{Tx}$, and a first integrating unit 7c-1.

The correlating unit 7a-1 is implemented by, for example, a correlation processing circuit 21 shown in FIG. 5.

The correlating unit 7a-1 performs a correlation process between the reception video signal $V(n_{Rx}, h, m)$ outputted from the A/D converter 6b-1 and a reference signal $Ex(h, m)$ based on an intra-pulse modulation signal $L_{chp}(h, t)$ outputted from an intra-pulse modulation signal generator 2c-$n_{Tx}$.

The radar device shown in FIG. 1 includes $N_{Tx}$ intra-pulse modulation signal generators. However, since the $N_{Tx}$ intra-pulse modulation signal generators output the same intra-pulse modulation signal $L_{chp}(h, t)$, the correlating unit 7a-1 may use an intra-pulse modulation signal $L_{chp}(h, t)$ outputted from any of the intra-pulse modulation signal generators.

Specifically, the correlating unit 7a-1 performs a Fast Fourier Transform (FFT) on the reception video signal $V(n_{Rx}, h, m)$ outputted from the A/D converter 6b-1.

In addition, the correlating unit 7a-1 performs an FFT on a reference signal $Ex(h, m)$ based on an intra-pulse modulation signal $L_{chp}(h, t)$ outputted from an intra-pulse modulation signal generator 2c-$n_{Tx}$.

The correlating unit 7a-1 multiplies $F_V(n_{Rx}, h, k_r)$ which is an FFT result of the reception video signal $V(n_{Rx}, h, m)$ by $F_{EX}(h, k_r)$ which is an FFT result of the reference signal $Ex(h, m)$. A variable $k_r$ is the sampling number in PRI.

The correlating unit 7a-1 performs an Inverse Fast Fourier Transform (IFFT) on $F_{V \cdot EX}(n_{Rx}, h, k_r)$ which is a multiplication result.

The correlating unit 7a-1 generates a signal $R_{PC}(n_{Rx}, h, l)$ based on the correlated range, as a signal strength signal indicating signal strength corresponding to the hit number h and the range l from the reception radar 4-1, from an IFFT result of the $F_{V \cdot EX}(n_{Rx}, h, k_r)$.

The correlating unit 7a-1 outputs the signal $R_{PC}(n_{Rx}, h, l)$ based on the correlated range to each of the demodulating units 7b-1-1 to 7b-1-$N_{Tx}$.

Each of the demodulating units 7b-1-1 to 7b-1-$N_{Tx}$ is implemented by, for example, a demodulation circuit 22 shown in FIG. 5.

The demodulating unit 7b-1-$n_{Tx}$ demodulates the signal $R_{PC}(n_{Rx}, h, l)$ based on the correlated range, using a pulse-to-pulse modulation signal $L_{hit}(n_{Tx}, h)$ outputted from the pulse-to-pulse modulation signal generator 2d-$n_{Tx}$ of the transmission radar 1-$n_{Tx}$.

The demodulating unit 7b-l-$n_{Tx}$ outputs a demodulated signal $R_{DEM}(n_{Tx}, n_{Rx}, h, l)$ which is the demodulated signal based on the correlated range to the first integrating unit 7c-1.

The first integrating unit 7c-1 is implemented by, for example, a first integration circuit 23 shown in FIG. 5.

The first integrating unit 7c-1 integrates the demodulated signals $R_{DEM}(n_{Tx}, n_{Rx}, h, l)$ outputted from the demodulating units 7b-1-1 to 7b-1-$N_{Tx}$, respectively, using candidate angles of arrival from the target $\theta'(n_\theta)$.

The first integrating unit 7c-1 outputs the integrated demodulated signal $R_{\Sigma Tx}(n_\theta, n_{Rx}, h, l)$ to the signal processor 8.

The signal processor 8 includes a frequency-domain converting unit 9, a candidate target detecting unit 10, and a relative value calculating unit 11.

The frequency-domain converting unit 9 is implemented by, for example, a frequency-domain conversion circuit 24 shown in FIG. 5.

The frequency-domain converting unit 9 converts the integrated demodulated signal $R_{\Sigma Tx}(n_\theta, n_{Rx}, h, l)$ outputted from the first integrating unit 7c-1 into a frequency-domain signal, and thereby generates a signal $R(n_\theta, n_{Rx}, f_d, l)$ based on the correlated range and Doppler frequency, as the frequency-domain signal.

The frequency-domain converting unit 9 outputs the signal $R(n_\theta, n_{Rx}, f_d, l)$ based on the correlated range and Doppler frequency to the candidate target detecting unit 10.

The candidate target detecting unit 10 is implemented by, for example, a candidate target detection circuit 25 shown in FIG. 5.

The candidate target detecting unit 10 detects a candidate for the target from the signal $R(n_\theta, n_{Rx}, f_d, l)$ based on the correlated range and Doppler frequency.

The candidate target detecting unit 10 outputs the candidate angle-of-arrival number $n_\theta'$, the velocity bin number $f_d'$, and the sampling number l' in a range direction of the detected candidate for the target to the relative value calculating unit 11.

The relative value calculating unit 11 is implemented by, for example, a relative value calculation circuit 26 shown in FIG. 5.

The relative value calculating unit 11 calculates the relative velocity $v'_{tgt}$ of the candidate target on the basis of the velocity bin number $f_d'$ outputted from the candidate target detecting unit 10.

In addition, the relative value calculating unit 11 calculates the relative range $R'_{tgt}$ of the candidate target on the basis of the sampling number l' in the range direction which is outputted from the candidate target detecting unit 10.

The relative value calculating unit 11 outputs each of the angle of arrival $\theta'(n_\theta')$ from the candidate target corresponding to the candidate angle-of-arrival number $n_\theta'$, and the relative velocity $v'_{tgt}$ and the relative range $R'_{tgt}$ of the candidate target outputted from the candidate target detecting unit 10 to the display 12.

The display 12 displays each of the angle of arrival $\theta'(n_\theta')$ from the candidate target, the relative velocity $v'_{tgt}$ of the candidate target, and the relative range $R'_{tgt}$ of the candidate target which are outputted from the relative value calculating unit 11 on a screen.

In FIG. 4, it is assumed that each of the correlating unit 7a-1, the demodulating units 7b-1-1 to 7b-1-$N_{Tx}$, and the first integrating unit 7c-1 which are components of the signal processing unit 7-1 is implemented by dedicated hardware such as that shown in FIG. 5. Namely, it is assumed that the signal processing unit 7-1 is implemented by the correlation processing circuit 21, the demodulation circuit 22, and the first integration circuit 23.

In addition, in FIG. 1, it is assumed that each of the frequency-domain converting unit 9, the candidate target detecting unit 10, and the relative value calculating unit 11 which are components of the signal processor 8 is implemented by dedicated hardware such as that shown in FIG. 5. Namely, it is assumed that the signal processor 8 is implemented by the frequency-domain conversion circuit 24, the candidate target detection circuit 25, and the relative value calculation circuit 26.

Each of the correlation processing circuit 21, the demodulation circuit 22, the first integration circuit 23, the frequency-domain conversion circuit 24, the candidate target detection circuit 25, and the relative value calculation circuit 26 corresponds, for example, to a single circuit, a composite circuit, a programmed processor, a parallel programmed processor, an Application Specific Integrated Circuit (ASIC), a Field-Programmable Gate Array (FPGA), or a combination thereof.

Each of the components of the signal processing unit 7-1 and the components of the signal processor 8 is not limited to being implemented by dedicated hardware, and may be implemented by software, firmware, or a combination of software and firmware.

The software or firmware is stored as a program in a memory of a computer. The computer refers to hardware that executes the program and corresponds, for example, to a Central Processing Unit (CPU), a central processor, a processing device, an arithmetic unit, a microprocessor, a microcomputer, a processor, or a Digital Signal Processor (DSP).

The memory of the computer corresponds to a nonvolatile or volatile semiconductor memory such as a Random Access Memory (RAM), a Read Only Memory (ROM), a flash memory, an Erasable Programmable Read Only Memory (EPROM), or an Electrically Erasable Programmable Read Only Memory (EEPROM); a magnetic disk, a flexible disk, an optical disc, a compact disc, a MiniDisc, or a Digital Versatile Disc (DVD).

Figure 6:
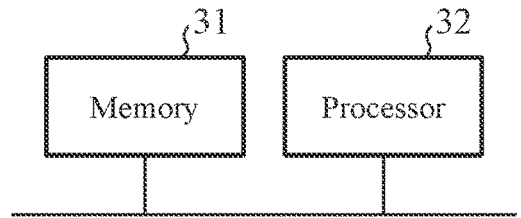

FIG. 6 is a hardware configuration of a computer in the case where each of the signal processing unit 7-1 and the signal processor 8 is implemented by software, firmware, or the like.

When each of the signal processing unit 7-1 and the signal processor 8 is implemented by software, firmware, or the like, a program for causing a computer to perform processing procedures of the correlating unit 7a-1, the demodulating units 7b-1-1 to 7b-1-$N_{Tx}$, the first integrating unit 7c-1, the frequency-domain converting unit 9, the candidate target detecting unit 10, and the relative value calculating unit 11 is stored in a memory 31. Then, a processor 32 of the computer executes the program stored in the memory 31.

FIG. 5 shows an example in which each of the components of the signal processing unit 7-1 and the components of the signal processor 8 is implemented by dedicated hardware. In addition, FIG. 6 shows an example in which each of the signal processing unit 7-1 and the signal processor 8 is implemented by software, firmware, or the like. However, they are merely examples, and some components of the signal processing unit 7-1 and some components of the signal processor 8 may be implemented by dedicated hardware and the other components may be implemented by software, firmware, or the like.

Next, the operation of the radar device shown in FIG. 1 will be described.

Figure 7:
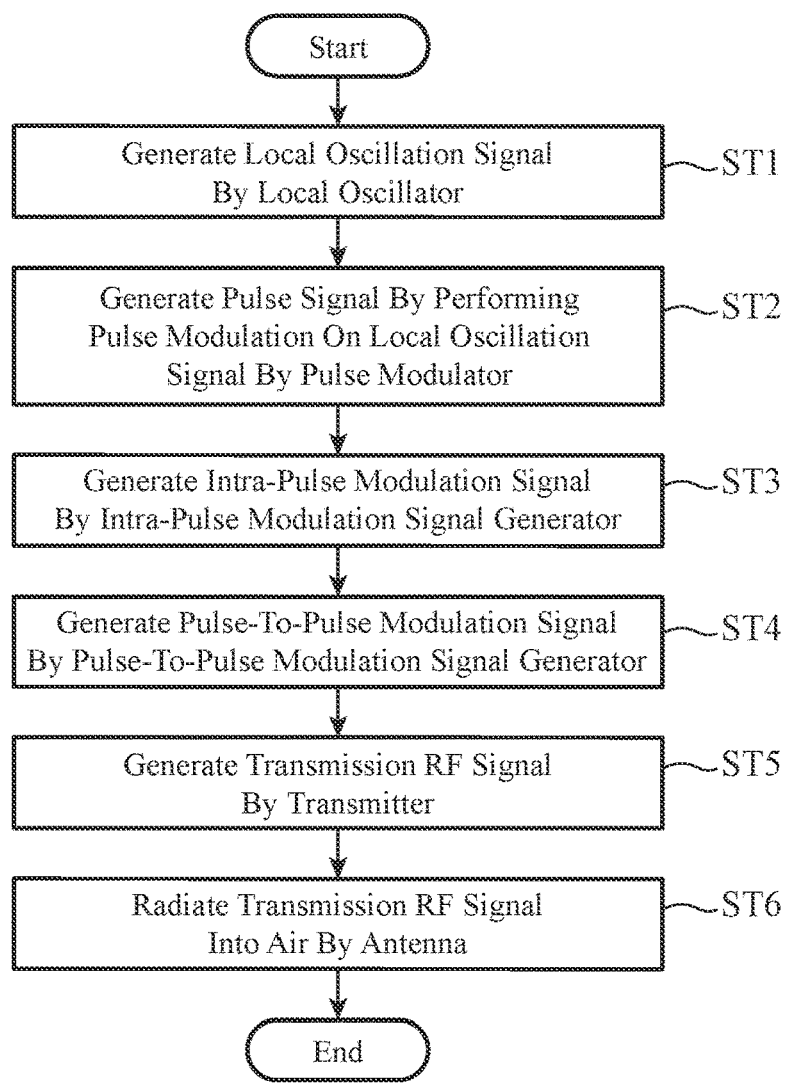
FIG. 7 is a flowchart showing processing of transmission radars 1-1 to 1-$N_{Tx}$.

FIG. 7 is a flowchart showing processing of the transmission radars 1-1 to 1-$N_{Tx}$.

First, with reference to FIG. 7, the operation of the transmission radars 1-1 to 1-$N_{Tx}$ will be described.

The local oscillator 2a-$n_{Tx}$ of the transmission radar 1-$n_{Tx}$ generates a local oscillation signal $L_0(t)$ as shown in the following equation (1) (step ST1 of FIG. 7):

$$L_0(t) = A_L \exp(j(2\pi f_0 t + \psi_0)) \quad (1)$$
$$(0 \leq t < T_{obs})$$

In equation (1), $A_L$ is the amplitude of the local oscillation signal $L_0(t)$, $\phi_0$ is the initial phase of the local oscillation signal $L_0(t)$, $f_0$ is the transmission center frequency of the local oscillation signal $L_0(t)$, and $T_{obs}$ is the observation time of the radar device shown in FIG. 1.

The local oscillator 2a-$n_{Tx}$ outputs the local oscillation signal $L_0(t)$ to each of the pulse modulator 2b-$n_{Tx}$ and the receiver 6a-1.

When the pulse modulator 2b-$n_{Tx}$ receives the local oscillation signal $L_0(t)$ from the local oscillator 2a-$n_{Tx}$, the pulse modulator 2b-$n_{Tx}$ performs pulse modulation on the local oscillation signal $L_0(t)$ as shown in the following equation (2), and thereby repeatedly generates a pulse signal $L_{pls}(h, t)$ (step ST2 of FIG. 7).

The pulse signal $L_{pls}(h, t)$ generated by the pulse modulator 2b-$n_{Tx}$ is a pulse signal with the pulse width $T_0$ and the pulse repetition interval $T_{pri}$.

$$L_{pls}(h, t) = \begin{cases} A_L \exp(j(2\pi f_0 t + \phi_0)), & hT_{pri} \leq t < hT_{pri} + T_0 \\ 0, & \text{otherwise} \end{cases} \quad (2)$$
$$(h = 0, 1, \ldots, H-1)$$

In equation (2), h is the hit number of a transmission RF signal $Tx(n_{Tx}, h, t)$ outputted from the transmitter 2e-$n_{Tx}$, and H is the number of hits of the transmission RF signal $Tx(n_{Tx}, h, t)$ represented by the following equation (3):

$$H = \text{floor}\left(\frac{T_{obs}}{T_{pri}}\right) \quad (3)$$

In equation (3), floor(X) is a function indicating an integer obtained by truncating the fractional part of a variable X.

The pulse modulator 2b-$n_{Tx}$ outputs the pulse signal $L_{pls}(h, t)$ to the transmitter 2e-$n_{Tx}$.

The intra-pulse modulation signal generator 2c-$n_{Tx}$ generates an intra-pulse modulation signal $L_{chp}(h, t)$ for performing frequency modulation on the pulse signal $L_{pls}(h, t)$, using a frequency modulation bandwidth B(h), as shown in the following equation (4) (step ST3 of FIG. 7). The frequency modulation bandwidth B(h) is fixed regardless of the hit number.

$$L_{chp}(h, t) = \begin{cases} A_L \exp\left(j2\pi \frac{\pm B(h)}{2T_0} t^2\right), & hT_{pri} \leq t < hT_{pri} + T_0 \\ 0, & \text{otherwise} \end{cases} \quad (4)$$
$$(h = 0, 1, \ldots, H-1)$$

In equation (4), for the symbol ±, + indicates an up chirp and − indicates a down chirp.

The intra-pulse modulation signal generator 2c-$n_{Tx}$ outputs the intra-pulse modulation signal $L_{chp}(h, t)$ to each of the transmitter 2e-$n_{Tx}$ and the correlating unit 7a-1.

The pulse-to-pulse modulation signal generator 2d-$n_{Tx}$ generates a pulse-to-pulse modulation signal $L_{hit}(n_{Tx}, h)$ for performing phase modulation on the pulse signal $L_{pls}(h, t)$, using the amount of phase modulation $\Delta\phi(n_{Tx}, h)$ which varies between hit numbers h, as shown in the following equation (5) (step ST4 of FIG. 7):

$$L_{hit}(n_{Tx}, h) = \exp(j\Delta\varphi(n_{Tx}, h)) \quad (5)$$

$$(h = 0, 1, \ldots, H - 1)$$

$$(n_{Tx} = 1, 2, \ldots, N_{Tx})$$

The pulse-to-pulse modulation signal generator $2d$-$n_{Tx}$ outputs the pulse-to-pulse modulation signal $L_{hit}(n_{Tx}, h)$ to each of the transmitter $2e$-$n_{Tx}$ and the demodulating unit $7b$-$1$-$n_{Tx}$.

Here, the amount of phase modulation $\Delta\phi(n_{Tx}, h)$ is, as shown in the following equation (6), a value determined from either one $P(n_{Tx})$ of a positive integer value that is less than or equal to a result of division obtained by dividing the number of hits H of the transmission RF signal $Tx(n_{Tx}, h, t)$ by the number $N_{Tx}$ of the transmission radars 1-1 to 1-$N_{Tx}$ and a value of 0; the hit number h; and the number of hits H:

$$\Delta\varphi(n_{Tx}, h) = 2\pi \frac{p(n_{Tx})}{H} h \quad (6)$$

$$\left(p(n_{Tx}) \in \left\{0, 1, \ldots, \text{floor}\left(\frac{H}{N_{Tx}}\right)\right\}\right)$$

The transmitter $2e$-$n_{Tx}$ multiplies the pulse signal $L_{pls}(h, t)$ outputted from the pulse modulator $2b$-$n_{Tx}$ by the intra-pulse modulation signal $L_{chp}(h, t)$ and the pulse-to-pulse modulation signal $L_{hit}(n_{Tx}, h)$, as shown in the following equation (7).

Figure 8:
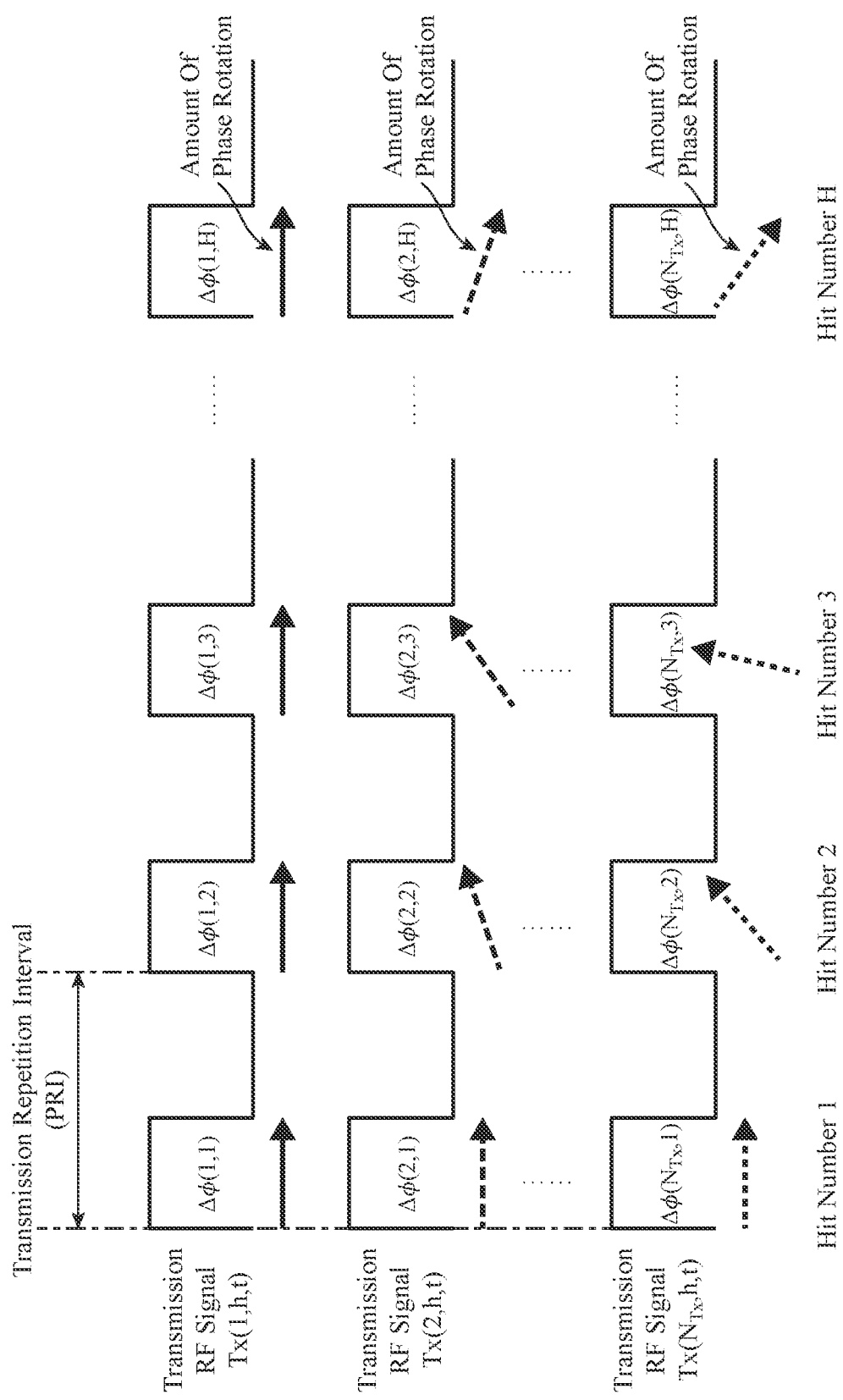
FIG. 8 is an illustrative diagram showing transmission RF signals Tx(1, h, t) to Tx($N_{Tx}$, h, t) generated by the transmission radars 1-1 to 1-$N_{Tx}$, respectively, in the radar device of the first embodiment.

By the transmitter $2e$-$n_{Tx}$ multiplying the pulse signal $L_{pls}(h, t)$ by the intra-pulse modulation signal $L_{chp}(h, t)$ and the pulse-to-pulse modulation signal $L_{hit}(n_{Tx}, h)$, the transmitter $2e$-$n_{Tx}$ generates a transmission RF signal $Tx(n_{Tx}, h, t)$ as shown in FIG. 8 (step ST5 of FIG. 7).

$$Tx(n_{Tx}, h, t) = L_{pls}(h, t)L_{cph}(h, t)L_{hit}(n_{Tx}, h) \quad (7)$$

$$= \begin{cases} A_L \exp\left(j\left\{2\pi\left[f_0 t \pm \frac{B(h)}{2T_0}t^2\right] + \psi_0\right\}\right) & hT_{pri} \leq t < \\ \exp(j\Delta\varphi(n_{Tx}, h)), & hT_{pri} + T_0 \\ 0, & \text{otherwise} \end{cases}$$

$$(h = 0, 1, \ldots, H - 1)$$

$$(n_{Tx} = 1, 2, \ldots, N_{Tx})$$

FIG. 8 is an illustrative diagram showing transmission RF signals $Tx(1, h, t)$ to $Tx(N_{Tx}, h, t)$ generated by the transmission radars 1-1 to 1-$N_{Tx}$, respectively, in the radar device of the first embodiment.

In FIG. 8, an arrow indicates the amount of phase rotation. $\Delta\phi(n_{Tx}, h)$ is the amount of phase modulation.

The transmitter $2e$-$n_{Tx}$ outputs the transmission RF signal $Tx(n_{Tx}, h, t)$ to the antenna $3$-$n_{Tx}$.

The antenna $3$-$n_{Tx}$ radiates the transmission RF signal $Tx(n_{Tx}, h, t)$ outputted from the transmitter $2e$-$n_{Tx}$ into the air (step ST6 of FIG. 7).

Figure 9:
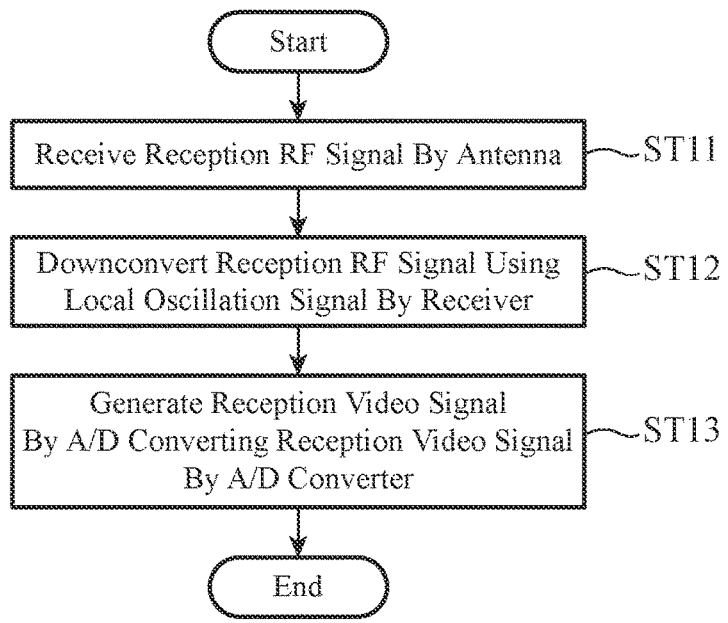
FIG. 9 is a flowchart showing processing of the reception radar 4-1.

FIG. 9 is a flowchart showing processing of the reception radar 4-1.

Figure 10:
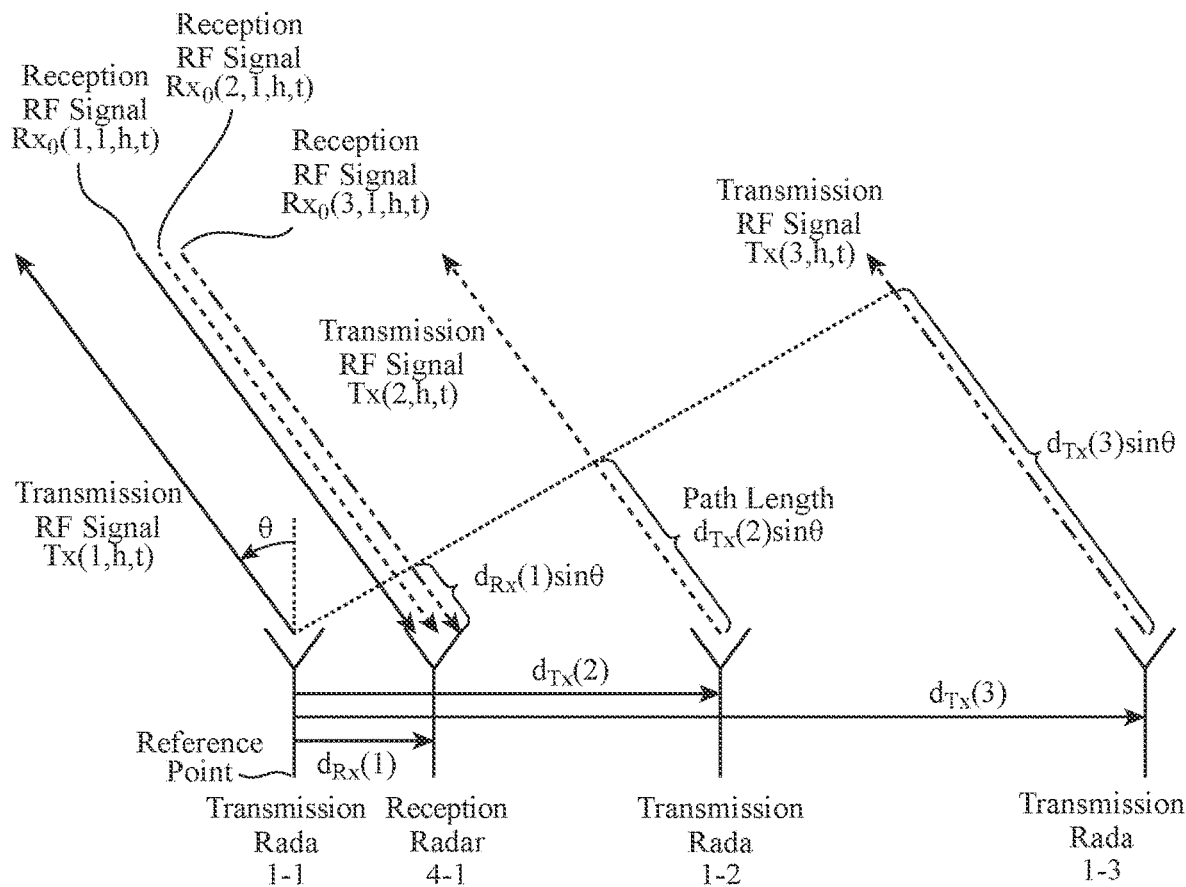
FIG. 10 is an illustrative diagram showing a positional relationship between transmission radars 1-1 to 1-3 and the reception radar 4-1 in the case where the number of transmission radars is $N_{Tx}$=3 and the number of reception radars is NRx=1, and a relationship between transmission RF signals and reception RF signals.

FIG. 10 is an illustrative diagram showing a positional relationship between transmission radars 1-1 to 1-3 and the reception radar 4-1 in the case where the number of transmission radars is $N_{Tx}=3$ and the number of reception radars is NRx=1, and a relationship between transmission RF signals and reception RF signals.

Next, with reference to FIG. 9, the operation of the reception radar 4-1 will be described.

Transmission RF signals $Tx(1, h, t)$ to $Tx(N_{Tx}, h, t)$ radiated from the transmission radars 1-1 to 1-$N_{Tx}$, respectively, are reflected by a target and then enter the antenna 5-1 as reflected waves $Rx_0(n_{Tx}, n_{Rx}, h, t)$ of the target, The antenna 5-1 receives the sum of the reflected waves $Rx_0(n_{Tx}, n_{Rx}, h, t)$ as a reception RF signal $Rx(n_{Rx}, h, t)$ (step ST11 of FIG. 9).

The antenna 5-1 outputs the reception RF signal $Rx(n_{Rx}, h, t)$ to the receiving unit 6-1.

The reception RF signal $Rx(n_{Rx}, h, t)$ is represented by the following equation (8).

$$Rx(n_{Rx}, h, t) = \sum_{n_{Tx}=1}^{n_{Tx}} Rx_0(n_{Tx}, n_{Rx}, h, t) \quad (8)$$

$$(h = 0, 1, \ldots, H - 1)$$

$$(n_{Rx} = 1, 2, \ldots, N_{Rx})$$

$Rx_0(n_{Tx}, n_{Rx}, h, t) =$ $$\begin{cases} A_R \exp\left(j\left\{2\pi\left[\begin{array}{l}f_0\left(t' - \frac{2(R_0 - vt)}{c}\right) \pm \\ \frac{B(h)}{2T_0}\left(t' - \frac{2(R_0 - vt)}{c}\right)^2\end{array}\right] + \psi_0\right\}\right) \\ \exp(j\Delta\varphi(n_{Tx}, h))\exp(j\psi_{Tx}(n_{Tx})) \quad hT_{pri} \leq t < hT_{pri} + T_0 \\ \exp(j\psi_{Rx}(n_{Rx})), \\ 0, \quad \text{otherwise} \end{cases}$$

$$(h = 0, 1, \ldots, H - 1)$$

$$(n_{Tx} = 1, 2, \ldots, N_{Tx})$$

$$(n_{Rx} = 1, 2, \ldots, N_{Rx})$$

In equation (8), $A_R$ is the amplitude of the reflected wave, $R_0$ is the initial value of target relative range, v is a target relative velocity, θ is a target angle, c is the speed of light, and t' is time in one hit.

$\phi_{Tx}(n_{Tx})$ is the phase difference of the transmission radar 1-$n_{Tx}$ and represented by the following equation (9).

$\phi_{Rx}(n_{Rx})$ is the phase difference of the reception radar 1-$n_{Rx}$ and represented by the following equation (10):

$$\psi_{Tx}(n_{Tx}) = \frac{2\pi f_0}{c} d_{Tx}(n_{Tx})\sin\theta \quad (9)$$

$$(n_{Tx} = 1, 2, \ldots, N_{Tx})$$

$$\psi_{Rx}(n_{Rx}) = \frac{2\pi f_0}{c} d_{Rx}(n_{Rx})\sin\theta \quad (10)$$

$$(n_{Rx} = 1, 2, \ldots, N_{Rx})$$

The receiving unit 6-1 performs a reception process on the reception RF signal $Rx(n_{Rx}, h, t)$ outputted from the antenna 5-1.

Specifically, the process is as follows.

The receiver $6a$-1 downconverts the frequency of the reception RF signal $Rx(n_{Rx}, h, t)$ outputted from the antenna 5-1, using a local oscillation signal $L_0(t)$ outputted from a local oscillator $2a\text{-}n_{Tx}$ (step ST12 of FIG. 9).

In addition, the receiver 6a-1 performs, for example, a process of removing noise included in the reception RF signal $Rx(n_{Rx}, h, t)$ whose frequency has been downconverted, using a band-pass filter.

The receiver 6a-1 amplifies the reception RF signal having passed through the band-pass filter, and then performs a phase detection process on the reception RF signal, and thereby generates a reception video signal $V'(n_{Rx}, h, t)$ such as that shown in the following equation (11):

$$V'(n_{Rx}, h, t) \sum_{n_{Tx}=1}^{N_{tx}} V'_0(n_{Tx}, n_{Rx}, h, t) = Rx(n_{Rx}, h, t)L'_0(t) \tag{11}$$

$$(h = 0, 1, \ldots, H - 1)$$

$$(n_{Rx} = 0, 1, \ldots, N_{Rx} - 1)$$

In equation (11), * is a complex conjugate.

$$V'_0(n_{Tx}, n_{Rx}, h, t) = Rx_0(n_{Tx}, n_{Rx}, h, t)L^*_0(t) \tag{12}$$

$$= \begin{cases} A_V \exp\left(j2\pi\left[\begin{array}{c} -f_0\dfrac{2(R_0 - vt)}{c} \pm \\ \dfrac{B(h)}{2T_0}\left(t' - \dfrac{2(R_0 - vt)}{c}\right)^2 \end{array}\right]\right) \\ \exp(j\Delta\varphi(n_{Tx}, h))\exp(j\psi_{Tx}(n_{Tx})) \quad hT_{pri} \le t < hT_{pri} + T_0 \\ \exp(j\psi_{Rx}(n_{Rx})), \\ 0, \quad\quad\quad\quad\quad\quad \text{otherwise} \end{cases}$$

$$(h = 0, 1, \ldots, H - 1)$$

$$(n_{Tx} = 1, 2, \ldots, N_{Tx})$$

$$(n_{Rx} = 1, 2, \ldots, N_{Rx})$$

The receiver 6a-1 outputs the reception video signal $V'(n_{Rx}, h, t)$ to the A/D converter 6b-1.

The A/D converter 6b-1 converts the reception video signal $V'(n_{Rx}, h, t)$ outputted from the receiver 6a-1 from an analog signal to a digital signal, and thereby generates a digital reception video signal $V_0(n_{Tx}, n_{Rx}, h, m)$ as shown in the following equation (13):

In equation (13), m is the sampling number in PRI and M is the number of samplings.

The A/D converter 6b-1 calculates the sum of reception video signals $V_0(n_{Tx}, n_{Rx}, h, m)$ whose number corresponds to several of the number $N_{Tx}$ of the transmission radars 1-1 to 1-$N_{Tx}$, and thereby generates a reception video signal $V(n_{Rx}, h, m)$ as shown in the following equation (14) (step ST13 of FIG. 9):

$$V(n_{Rx}, h, m) = \sum_{n_{tx}=1}^{N_{Tx}} V_0(n_{Tx}, n_{Rx}, h, m) \tag{14}$$

$$(m = 0, 1, \ldots, M - 1)$$

$$(h = 0, 1, \ldots, H - 1)$$

$$(n_{Rx} = 1, 2, \ldots, N_{Rx})$$

The A/D converter 6b-1 outputs the reception video signal $V(n_{Rx}, h, m)$ to the signal processing unit 7-1.

Next, before describing the operation of the signal processing unit 7-1, the waveform of the reception video signal $V(n_{Rx}, h, m)$ outputted from the reception radar 4-1 will be described.

In addition, the waveform of a reception video signal outputted from the reception radar in the radar device disclosed in Non-Patent Literature 1 will be described.

$$(13)$$

$$V_0(n_{Tx}, n_{Rx}, h, m) =$$

$$\begin{cases} A\exp\left(-j2\pi f_0 \dfrac{2(R_0 - v(hT_{pri} + m\Delta t))}{c}\right) \\ \exp\left(\pm j2\pi \dfrac{B(h)}{2T_0}\left(m\Delta t - \dfrac{2(R_0 - v(hT_{pri} + m\Delta t))}{c}\right)^2\right) \\ \exp(j\Delta\varphi(n_{Tx}, h)) \quad\quad hT_{pri} \le t < hT_{pri} + T_0 \\ \exp(j\psi_{Tx}(n_{Tx}))\exp(j\psi_{Rx}(n_{Rx})), \\ 0, \quad\quad\quad\quad\quad \text{otherwise} \end{cases}$$

$$(m = 0, 1, \ldots, M - 1)$$

$$(h = 0, 1, \ldots, H - 1)$$

$$(n_{Tx} = 1, 2, \ldots, N_{Tx})$$

$$(n_{Rx} = 1, 2, \ldots, N_{Rx})$$

First, a plurality of transmission radars $n_{Tx}$ in the radar device disclosed in Non-Patent Literature 1 generate transmission RF signals by performing phase modulation on pulse signals with the same transmission frequency, using the amounts of phase modulation $\Delta\phi(n_{Tx}, h)$.

The amount of phase modulation $\Delta\phi(n_{Tx}, h)$ is the amount of modulation that varies between the transmission radars and varies between hits as shown in the following equation (15):

$$\Delta\varphi(N_{Tx}, h) = 2\pi \frac{(n_{Tx}-1)}{N_{Tx}} h \quad (15)$$

$(h = 1, 2, \ldots, H-1)$ $(n_{Tx} = 1, 2, \ldots, N_{Tx})$

As with the transmission radars 1-1 to 1-$N_{Tx}$ shown in FIG. 1, the plurality of transmission radars radiate the transmission RF signals with a hit number h (h=1, 2, . . . , H) into the air.

The waveform of a signal obtained by performing signal processing on reception RF signals received at this time by the reception radar in the radar device disclosed in Non-Patent Literature 1 is as shown in FIG. 11. The signal processing for the reception RF signals includes a demodulation process, an integration process, and the like, for the reception RF signals.

Figure 11A:
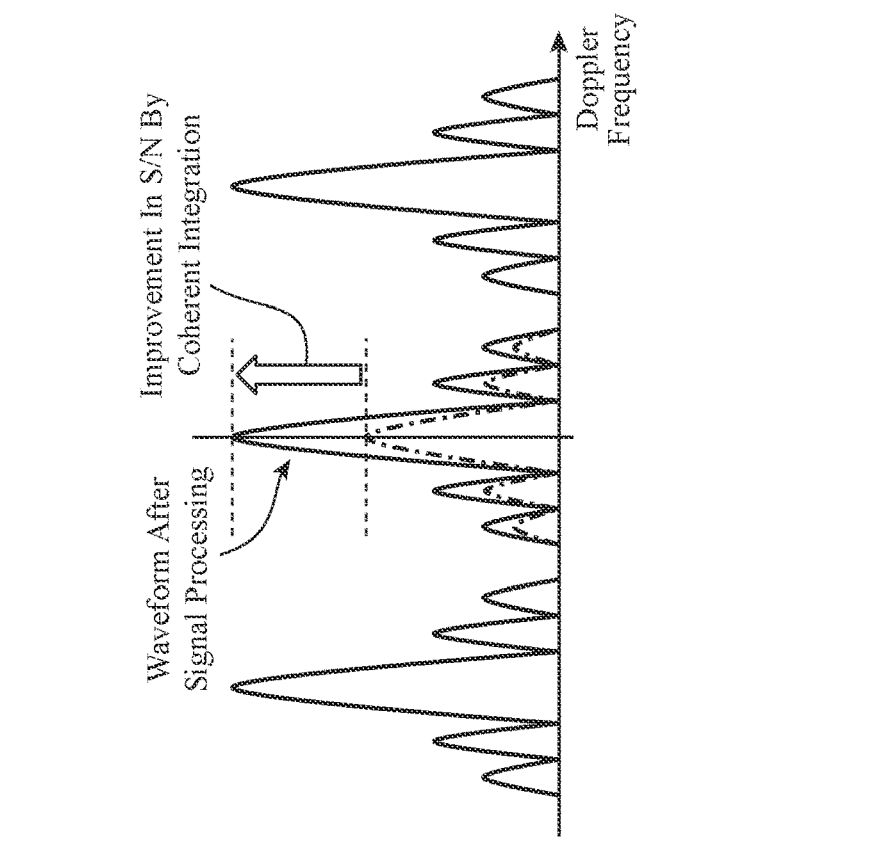
FIG. 11A is an illustrative diagram showing the waveforms of demodulated signals of reception RF signals for transmission RF signals radiated from each of three transmission radars.

FIG. 11A is an illustrative diagram showing the waveforms of demodulated signals of reception RF signals for transmission RF signals radiated from each of three transmission radars.

Figure 11B:
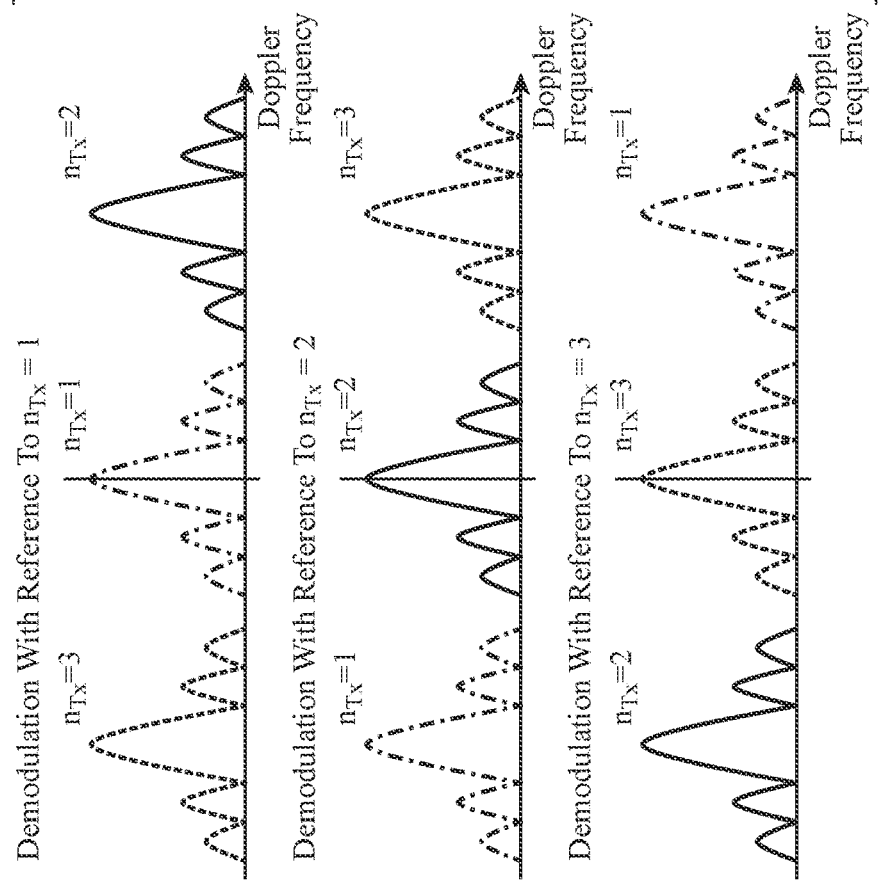
FIG. 11B is an illustrative diagram showing the waveform of a signal obtained by integrating each demodulated signal.

FIG. 11B is an illustrative diagram showing the waveform of a signal obtained by integrating each demodulated signal.

The signal having been subjected to signal processing includes signals with the same waveform whose number corresponds to the number of the transmission radars, in a frequency range not including aliased Doppler frequency. In the field of radar devices, the frequency range not including aliased Doppler frequency is sometimes called a frequency range measurable without ambiguity.

In an example of FIG. 11A, since the number of the plurality of transmission radars is three, a signal having been subjected to signal processing includes three demodulated signals.

For example, when a demodulation process is performed with reference to a transmission radar with $n_{Tx}=1$, the waveform of a demodulated signal of a reception RF signal for the transmission radar with $n_{Tx}=1$ appears near the center frequency of the frequency range not including aliased Doppler frequency.

Here, the waveform of a demodulated signal of a reception RF signal for a transmission radar with $n_{Tx}=2$ appears on a higher Doppler frequency side than the waveform of the demodulated signal of the reception RF signal for the transmission radar with $n_{Tx}=1$.

The waveform of a demodulated signal of a reception RF signal for a transmission radar with $n_{Tx}=3$ appears on a lower Doppler frequency side than the waveform of the demodulated signal of the reception RF signal for the transmission radar with $n_{Tx}=1$.

Figure 12:
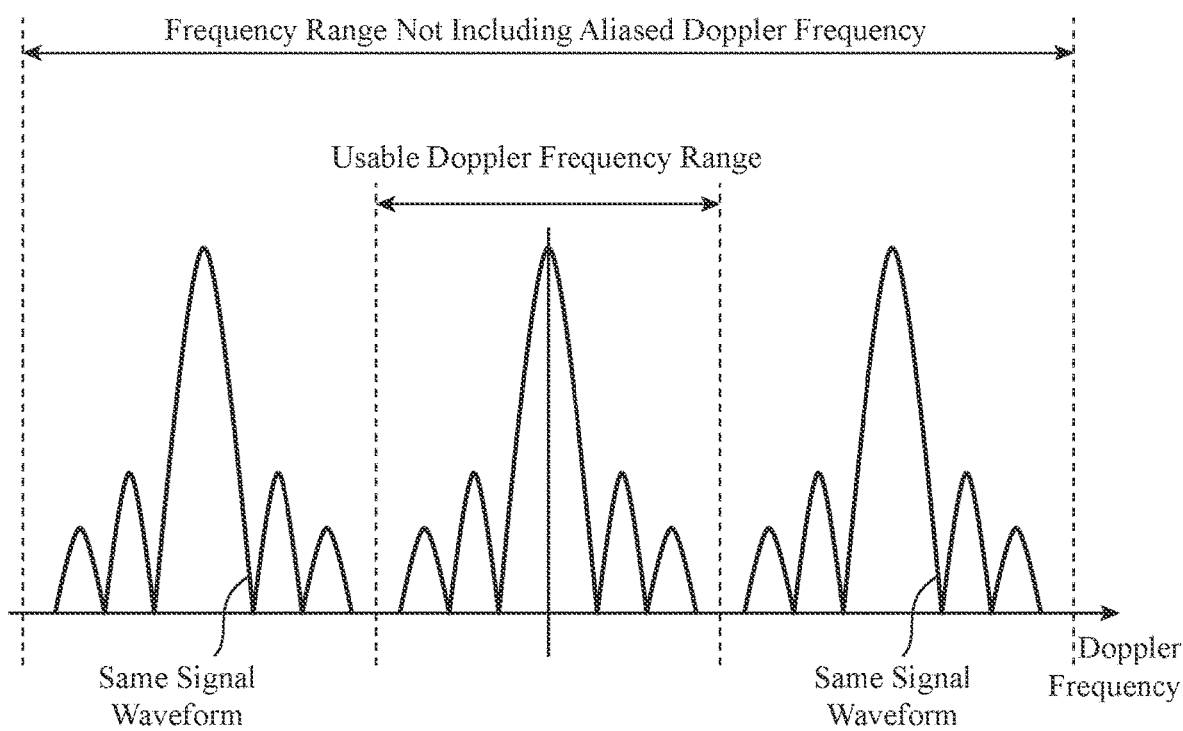
FIG. 12 is an illustrative diagram showing a frequency range not including aliased Doppler frequency, a usable Doppler frequency range, and the waveforms of three demodulated signals.

FIG. 12 is an illustrative diagram showing a frequency range not including aliased Doppler frequency, a usable Doppler frequency range, and the waveforms of three demodulated signals.

For example, it is assumed that the frequency range not including aliased Doppler frequency is a range of Doppler frequencies in which the relative velocity to a target corresponds to −90 m/s to +90 m/s.

In this example, when a demodulation process is performed with reference to the transmission radar with $n_{Tx}=1$, if the relative velocity to the target is 0, then the waveform of a demodulated signal of a reception RF signal for the transmission radar with $n_{Tx}=1$ appears in a range of Doppler frequencies corresponding to −30 m/s to +30 m/s.

In addition, the waveform of a demodulated signal of a reception RF signal for the transmission radar with $n_{Tx}=2$ appears in a range of Doppler frequencies corresponding to +30 m/s to +90 m/s.

However, when the relative velocity to the target is, for example, +40 m/s, the waveform of a demodulated signal of a reception RF signal for the transmission radar with $n_{Tx}=1$ appears in a range of Doppler frequencies corresponding to +10 m/s to +70 m/s.

The range of Doppler frequencies corresponding to +10 m/s to +70 m/s partially overlaps the range of Doppler frequencies in which the waveform of the demodulated signal of the reception RF signal for the transmission radar with $n_{Tx}=2$ appears when the relative velocity to the target is 0.

Therefore, when the relative velocity to the target exceeds +30 m/s, it becomes difficult to discern between the waveform of the demodulated signal of the reception RF signal for the transmission radar with $n_{Tx}=1$ and the waveform of the demodulated signal of the reception RF signal for the transmission radar with $n_{Tx}=2$.

For the above reason, the radar device disclosed in Non-Patent Literature 1 cannot use the entire frequency range not including aliased Doppler frequency, as a frequency range used to detect a candidate target.

In the radar device disclosed in Non-Patent Literature 1, the frequency range that can be used to detect a candidate target is limited to a range obtained by dividing the frequency range not including aliased Doppler frequency by the number of transmission radars. When the frequency range not including aliased Doppler frequency is a range of Doppler frequencies in which the relative velocity corresponds to −90 m/s to +90 m/s, the frequency range that can be used to detect a candidate target is limited to a range of Doppler frequencies corresponding to −30 m/s to +30 m/s.

Therefore, it is difficult for the radar device disclosed in Non-Patent Literature 1 to detect a candidate target with a relative velocity higher than ±30 m/s.

The waveform of a signal obtained by performing signal processing on a reception RF signal $Rx(n_{Rx}, h, t)$ received by the reception radar 4-1 in the radar device shown in FIG. 1 is as shown in FIGS. 13 and 14. The signal processing for the reception RF signal $Rx(n_{Rx}, h, t)$ includes a demodulation process, an integration process, and the like, for the reception RF signal $Rx(n_{Rx}, h, t)$.

Figure 13A:
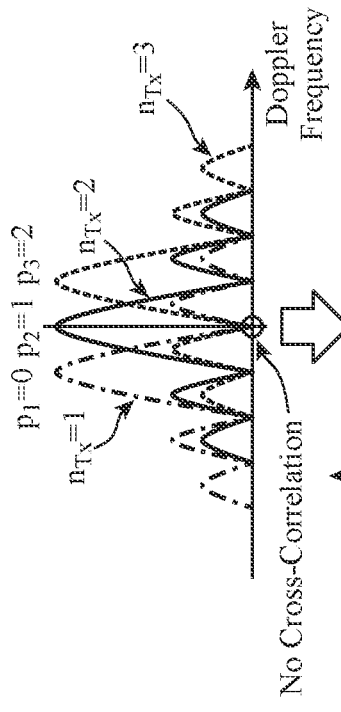
FIG. 13A is an illustrative diagram showing the waveforms of a demodulated signal of a reception RF signal Rx(1, h, t) to a demodulated signal of a reception RF signal Rx(3, h, t) obtained when a demodulation process is performed with reference to $n_{Tx}$=1, and showing that cross-correlations of each of the demodulated signal of the reception RF signal Rx(2, h, t) and the demodulated signal of the reception RF signal Rx(3, h, t) are canceled out.
Figure 13A:
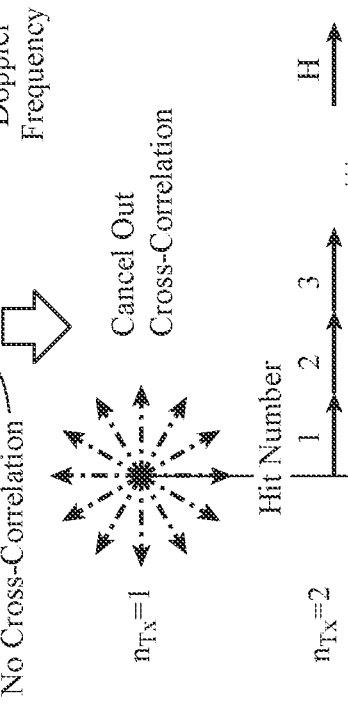
Figure 13A:
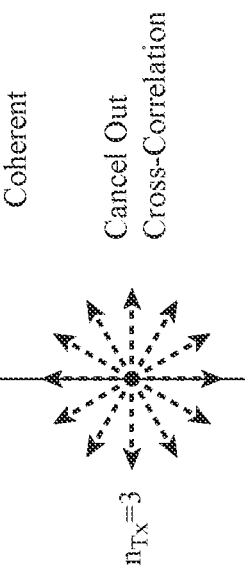

FIG. 13A is an illustrative diagram showing the waveforms of a demodulated signal of a reception RF signal Rx(1, h, t) to a demodulated signal of a reception RF signal Rx(3, h, t) obtained when a demodulation process is performed with reference to $n_{Tx}=1$, and showing that cross-correlations of each of the demodulated signal of the reception RF signal Rx(2, h, t) and the demodulated signal of the reception RF signal Rx(3, h, t) are canceled out.

Figure 13B:
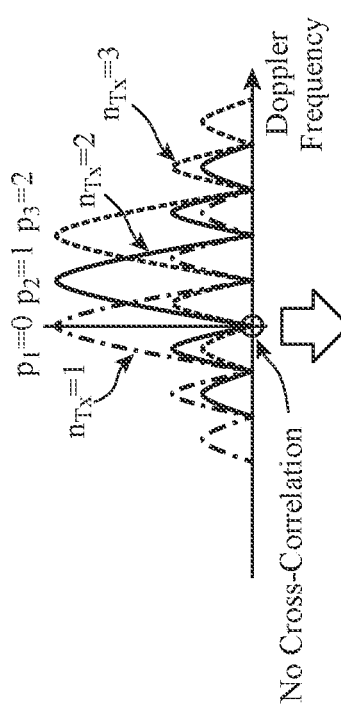
FIG. 13B is an illustrative diagram showing the waveforms of a demodulated signal of a reception RF signal Rx(1, h, t) to a demodulated signal of a reception RF signal Rx(3, h, t) obtained when a demodulation process is performed with reference to $n_{Tx}$=2, and showing that cross-correlations of each of the demodulated signal of the reception RF signal Rx(1, h, t) and the demodulated signal of the reception RF signal Rx(3, h, t) are canceled out.
Figure 13B:
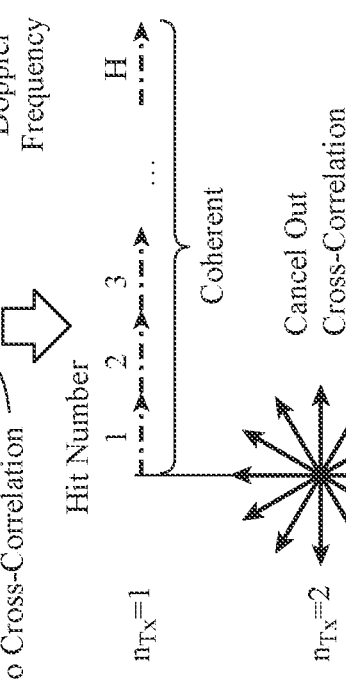
Figure 13B:
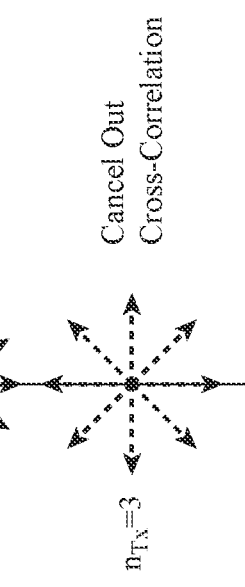

FIG. 13B is an illustrative diagram showing the waveforms of a demodulated signal of a reception RF signal Rx(1, h, t) to a demodulated signal of a reception RF signal Rx(3, h, t) obtained when a demodulation process is performed with reference to $n_{Tx}=2$, and showing that cross-correlations of each of the demodulated signal of the reception RF signal Rx(1, h, t) and the demodulated signal of the reception RF signal Rx(3, h, t) are canceled out.

Figure 14A:
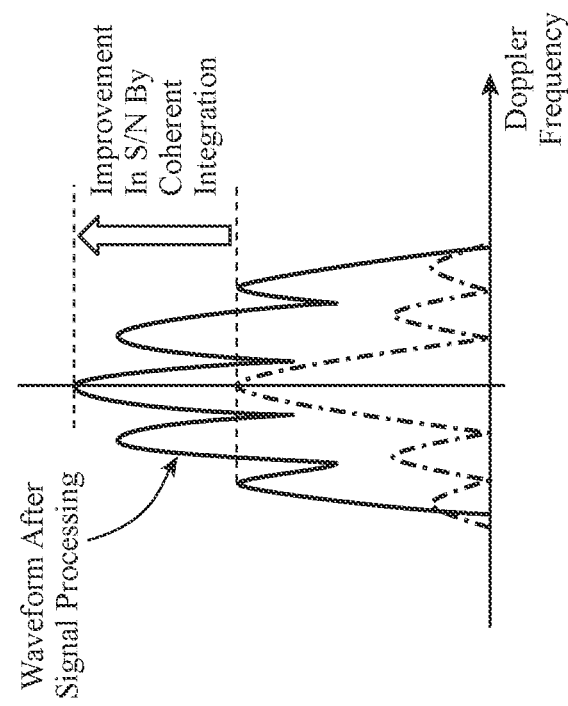
FIG. 14A is an illustrative diagram showing the waveforms of a demodulated signal of a reception RF signal Rx(1, h, t) to a demodulated signal of a reception RF signal Rx(3, h, t) for transmission RF signals Tx(1, h, t) to Tx(3, h, t)

FIG. 14A is an illustrative diagram showing the waveforms of a demodulated signal of a reception RF signal Rx(1, h, t) to a demodulated signal of a reception RF signal Rx(3, h, t) for transmission RF signals Tx(1, h, t) to Tx(3, h, t).

Figure 14B:
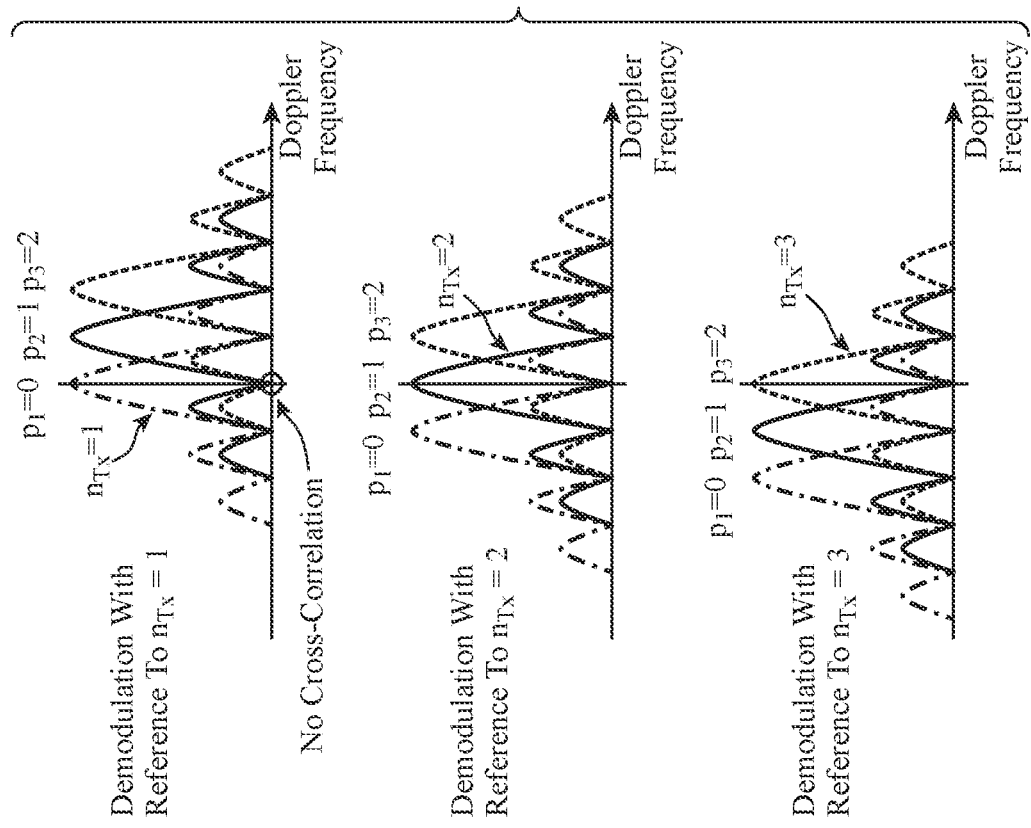
FIG. 14B is an illustrative diagram showing the waveform of a signal obtained by integrating each demodulated signal.

FIG. 14B is an illustrative diagram showing the waveform of a signal obtained by integrating each demodulated signal.

FIGS. 13A, 13B, 14A, and 14B show an example in which there are three transmission radars.

In the radar device shown in FIG. 1, a pulse-to-pulse modulation signal generator $2d\text{-}n_{Tx}$ generates a pulse-to-pulse modulation signal $L_{hit}(n_{Tx}, h)$ using the amount of phase modulation $\Delta\phi(n_{Tx}, h)$ shown in equation (6).

Therefore, at a peak position of Doppler frequency of a demodulated signal of each of the reception RF signals Rx(1, h, t) to Rx(3, h, t), demodulated signals of other reception RF signals cancel each other out, resulting in a null point, and thus a cross-correlation does not occur.

In an example of FIG. 13A, at a peak position of Doppler frequency of the demodulated signal of the reception RF signal Rx(1, h, t), each of the demodulated signal of the reception RF signal Rx(2, h, t) and the demodulated signal of the reception RF signal Rx(3, h, t) cancels out their cross-correlation.

In an example of FIG. 13B, at a peak position of Doppler frequency of the demodulated signal of the reception RF signal Rx(2, h, t), each of the demodulated signal of the reception RF signal Rx(1, h, t) and the demodulated signal of the reception RF signal Rx(3, h, t) cancels out their cross-correlation.

Thus, as shown in FIG. 14B, the demodulated signals of the respective reception RF signals Rx(1, h, t) to Rx(3, h, t) can be coherently integrated, improving S/N which is a signal-to-noise ratio.

Figure 15:
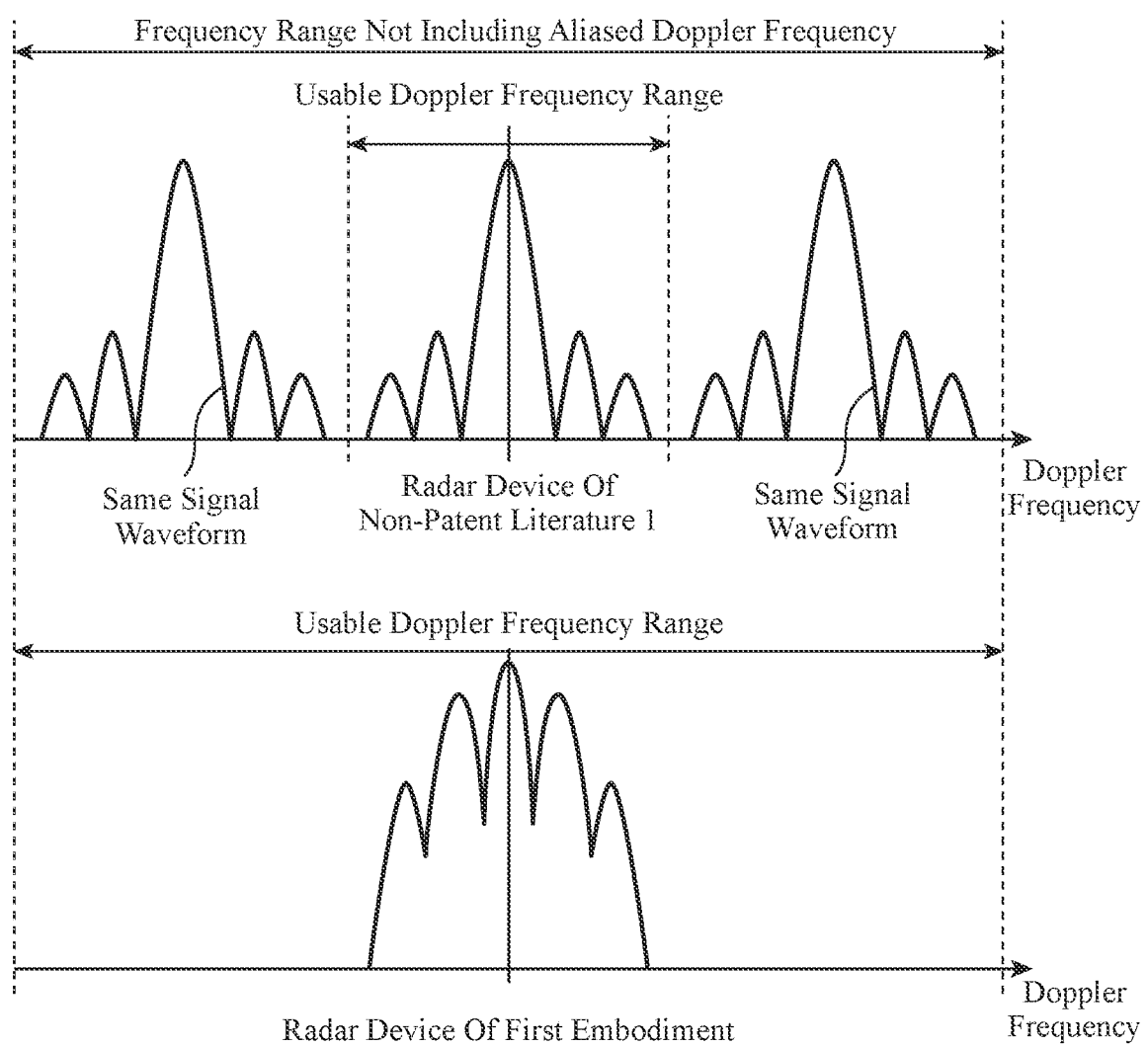
FIG. 15 is an illustrative diagram showing a frequency range not including aliased Doppler frequency, a usable Doppler frequency range, and the waveform of a demodulated signal having been subjected to an integration process.

FIG. 15 is an illustrative diagram showing a frequency range not including aliased Doppler frequency, a usable Doppler frequency range, and the waveform of a demodulated signal having been subjected to an integration process.

In the radar device disclosed in Non-Patent Literature 1, as described above, the frequency range that can be used to detect a candidate target is limited to a range obtained by dividing the frequency range not including aliased Doppler frequency by the number of transmission radars.

In the radar device shown in FIG. 1, at a peak position of Doppler frequency of a demodulated signal of a given reception RF signal, cross-correlations of demodulated signals of other reception RF signals do not occur. Therefore, as shown in FIG. 15, the radar device shown in FIG. 1 can use the entire frequency range not including aliased Doppler frequency, as a frequency range that can be used to detect a candidate target.

Thus, for example, when the frequency range not including aliased Doppler frequency is a range of Doppler frequencies in which the relative velocity to a target corresponds to −90 m/s to +90 m/s, the radar device shown in FIG. 1 can detect a target with a relative velocity of −90 m/s to +90 m/s.

Figure 16:
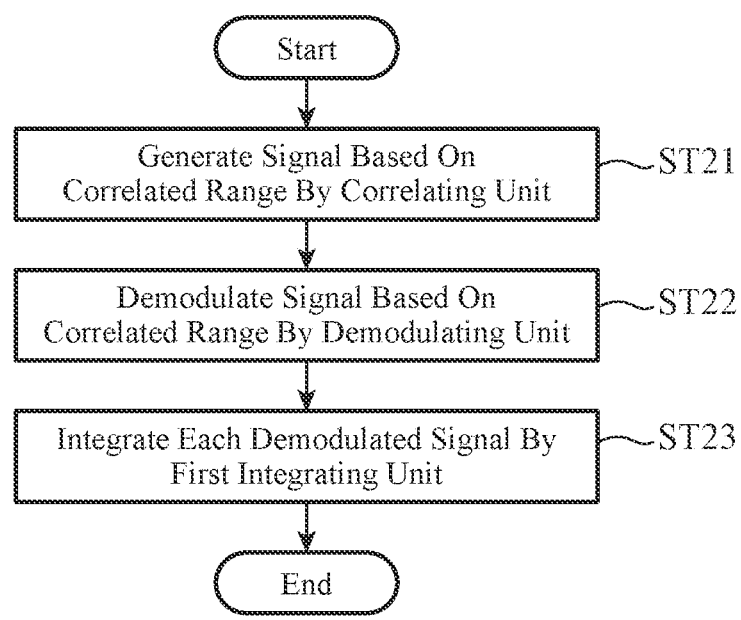
FIG. 16 is a flowchart showing processing of the signal processing unit 7-1.

FIG. 16 is a flowchart showing processing of the signal processing unit 7-1.

Figure 17:
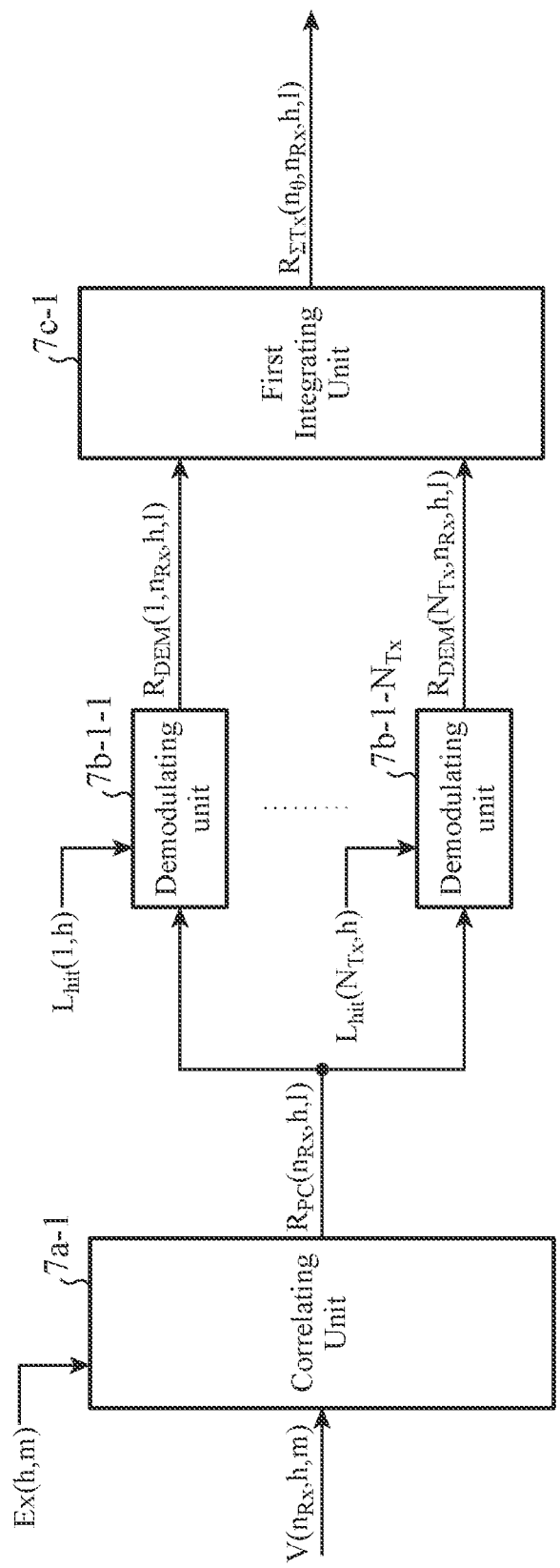
FIG. 17 is an illustrative diagram showing an input-output relationship of the signal processing unit 7-1.

FIG. 17 is an illustrative diagram showing an input-output relationship of the signal processing unit 7-1.

Figure 18:
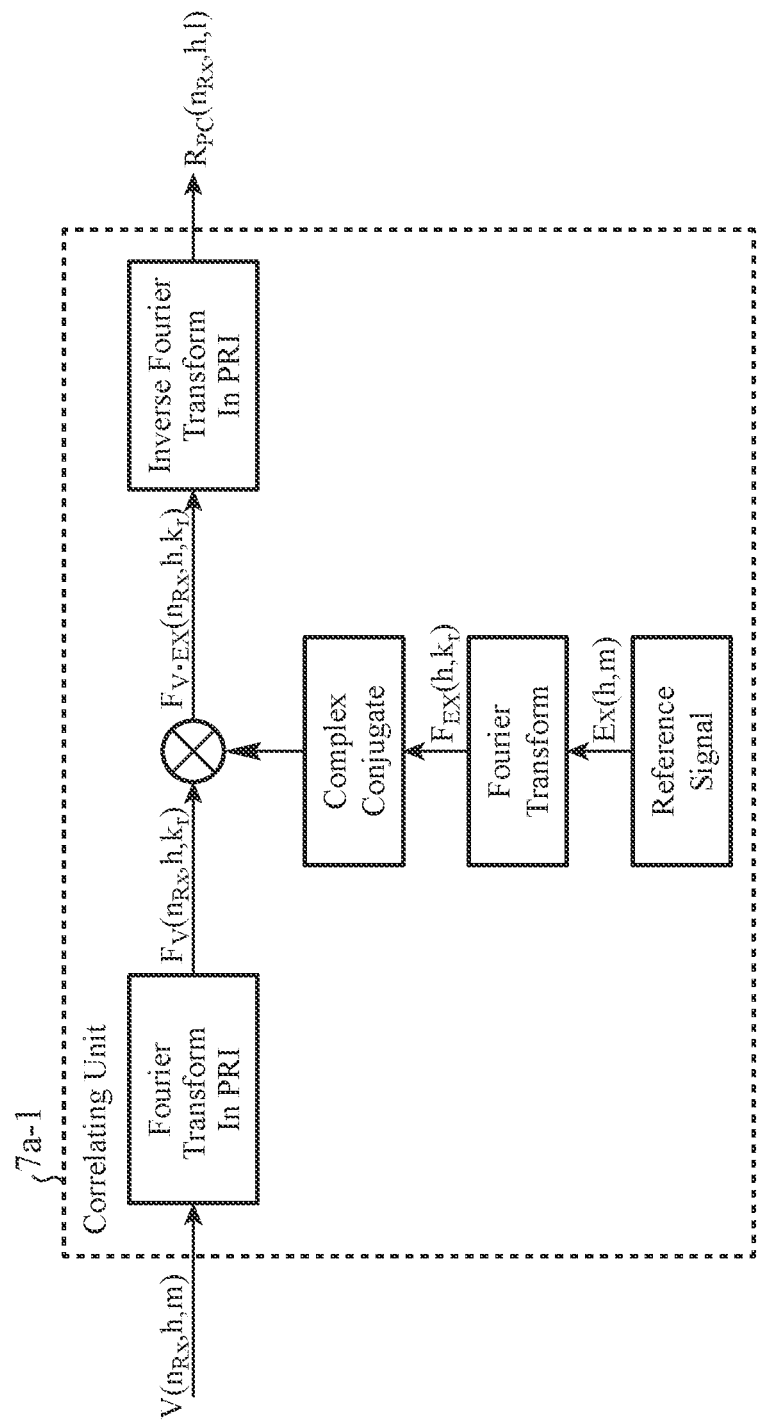
FIG. 18 is an illustrative diagram showing an input-output relationship of a correlating unit 7a-1.

FIG. 18 is an illustrative diagram showing an input-output relationship of the correlating unit 7a-1.

Next, with reference to FIGS. 16 to 18, the operation of the signal processing unit 7-1 will be described.

The correlating unit 7a-1 accepts as input the reception video signal $V(n_{Rx}, h, m)$ outputted from the A/D converter 6b-1.

The reception video signal $V(n_{Rx}, h, m)$ is a signal in which, as represented by equation (14), signals having been subjected to pulse-to-pulse modulation at the same center frequency by the transmission radars 1-1 to 1-$N_{Tx}$ are superimposed with modulation phase differences.

The correlating unit 7a-1 performs an FFT on the reception video signal $V(n_{Rx}, h, m)$ outputted from the A/D converter 6b-1, and thereby obtains an FFT result $F_V(n_{Rx}, h, k_r)$ shown in the following equation (16):

$$F_V(n_{Rx}, h, k_r) = \sum_{m=0}^{M-1} (n_{Rx}, h, m)\exp\left(-j2\pi\frac{m}{M_{fft}}k_r\right) \quad (16)$$

$(k_r = 0, 1, \ldots, M_{fft} - 1)$ $(h = 0, 1, \ldots, H - 1)$ $(n_{Rx} = 1, 2, \ldots, N_{Rx})$ In equation (16), $k_r$ is the sampling number in PRI and $M_{fft}$ is the number of FFT points.

The correlating unit 7a-1 performs an FFT on a reference signal Ex(h, m) based on an intra-pulse modulation signal $L_{chp}(h, t)$ which is represented by the following equation (17), and thereby obtains an FFT result $F_{EX}(h, k_r)$ shown in the following equation (18).

Calculation of the reference signal Ex(h, m) based on the intra-pulse modulation signal $L_{chp}(h, t)$ may be performed by the intra-pulse modulation signal generator $2c\text{-}n_{Tx}$ or may be performed by the correlating unit 7a-1.

$$Ex(h, m) = \begin{cases} A_R\exp\left(j2\pi\left(\pm\frac{B(h)}{2T_0}m^2\Delta t^2\right)\right), \\ \quad 0 \leq m\Delta t \leq T_0 \\ 0, \text{ otherwise} \end{cases} \quad (17)$$

$(m = 0, 1, \ldots, M)$ $(h = 0, 1, \ldots, H - 1)$ $$F_{Ex}(h, k_r) = \sum_{m=0}^{M-1} Ex(h, m)\exp\left(-j2\pi\frac{m}{M_{fft}}k_r\right) \quad (18)$$

$(k_r = 0, 1, \ldots, M_{fft} - 1)$ $(h = 0, 1, \ldots, H - 1)$

The correlating unit 7a-1 multiplies the FFT result $F_V(n_{Rx}, h, k_r)$ of the reception video signal $V(n_{Rx}, h, m)$ by the FFT result $F_{EX}(h, k_r)$ of the reference signal Ex(h, m).

$F_{V \cdot EX}(n_{Rx}, h, k_r)$ which is a multiplication result is represented by the following equation (19):

$F_{V \cdot Ex}(n_{Rx}, h, k_r) = F_V(n_{Rx}, h, k_r)F_{Ex}^*(k_r)$ $(k_r = 0, 1, \ldots, M_{fft} - 1)$ $(h = 0, 1, \ldots, H - 1)$ $(n_{Rx} = 1, 2, \ldots, N_{Rx})$ \quad (19)

The correlating unit 7a-1 performs an IFFT on the multiplication result $F_{V \cdot EX}(n_{Rx}, h, k_r)$.

The correlating unit 7a-1 generates, as shown in the following equation (20), a signal $R_{PC}(n_{Rx}, h, l)$ based on the correlated range from the IFFT result of the multiplication result $F_{V \cdot EX}(n_{Rx}, h, k_r)$ (step ST21 of FIG. 16):

$$R_{PC}(n_{Rx}, h, l) = \frac{1}{M} \sum_{k_r=0}^{M_{fft}-1} F_{V \cdot Ex}(n_{Rx}, h, k_r) \exp\left(j2\pi \frac{k_r}{M_{fft}} l\right) \quad (20)$$

$(l = 0, 1, \ldots, M_{fft} - 1)$ $(h = 0, 1, \ldots, H - 1)$ $(n_{Rx} = 1, 2, \ldots, N_{Rx})$ In equation (20), l is the range from the reception radar 4-1.

The correlating unit 7a-1 outputs the signal $R_{PC}(n_{Rx}, h, l)$ based on the correlated range to each of the demodulating units 7b-1-1 to 7b-1-$N_{Tx}$.

The demodulating unit 7b-1-$n_{Tx}$ demodulates the signal $R_{PC}(n_{Rx}, h, l)$ based on the correlated range, using the pulse-to-pulse modulation signal $L_{hit}(n_{Tx}, h)$ outputted from the pulse-to-pulse modulation signal generator 2d-$n_{Tx}$ of the transmission radar 1-$n_{Tx}$ (step ST22 of FIG. 16).

The demodulating unit 7b-1-$n_{Tx}$ outputs a demodulated signal $R_{DEM}(n_{Tx}, n_{Rx}, h, l)$ which is the demodulated signal based on the correlated range to the first integrating unit 7c-1.

The demodulated signal $R_{DEM}(n_{Tx}, n_{Rx}, h, l)$ is represented by the following equation (21):

$$R_{DEM}(n_{Tx}, n_{Rx}, h, l) = R_{PC}(n_{Rx}, h, l) L'_{hit}(n_{Rx}, h)$$

$(l = 0, 1, \ldots, M_{fft} - 1)$ $(h = 0, 0, \ldots, H - 1)$ $(n_{Tx} = 1, 2, \ldots, N_{Tx})$ $(n_{Rx} = 1, 2, \ldots, N_{Rx}) \quad (21)$ The first integrating unit 7c-1 integrates each demodulated signal $R_{DEM}(n_{Tx}, n_{Rx}, h, l)$ outputted from the demodulating units 7b-1-1 to 7b-1-$N_{Tx}$, using candidate angles of arrival from the target $\theta'(n_\theta)$ (step ST23 of FIG. 16).

The first integrating unit 7c-1 outputs the integrated demodulated signal $R_{\Sigma Tx}(n_\theta, n_{Rx}, h, l)$ to the signal processor 8.

The integrated demodulated signal $R_{\Sigma Tx}(n_\theta, n_{Rx}, h, l)$ is represented by the following equation (22):

$$R_{\Sigma Tx}(n_\theta, n_{Rx}, h, l) = \sum_{n_{Tx}=1}^{N_{Tx}} R_{DEM}(n_{Tx}, n_{Rx}, h, l) \exp\left(j2\pi f_0 \frac{d_{Tx}(n_{Tx}) \sin \theta'(n_\theta)}{c}\right) \quad (22)$$

$(n_\theta = 0, 1, \ldots, N_\theta - 1)$ $(l = 0, 1, \ldots, M_{fft} - 1)$ $(h = 0, 1, \ldots, H_{rzt} - 1)$ $(n_{Rx} = 0, 1, \ldots, N_{Rx} - 1)$ In equation (22), $n_\theta$ is the candidate angle-of-arrival number and $N_\theta$ is the number of candidate angles of arrival.

When $\theta = \theta'(n_\theta)$, the demodulated signals $R_{DEM}(n_{Tx}, n_{Rx}, h, l)$ are coherently integrated, and a signal $R(n_\theta, n_{Rx}, f_d, l)$ based on the correlated range and Doppler frequency which is generated by the frequency-domain converting unit 9 exhibits a maximum value.

The frequency-domain converting unit 9 converts the integrated demodulated signal $R_{\Sigma Tx}(n_\theta, n_{Rx}, h, l)$ outputted from the first integrating unit 7c-1 into a frequency-domain signal, and thereby generates a signal $R(n_\theta, n_{Rx}, f_d, l)$ based on the correlated range and Doppler frequency, as the frequency-domain signal.

The signal $R(n_\theta, n_{Rx}, f_d, l)$ is represented by the following equation (23):

$$R(n_\theta, n_{Rx}, f_d, l) = \sum_{h=0}^{H-1} R_{\Sigma Tx}(n_\theta, n_{Rx}, h, l) \exp\left(-j2\pi \frac{h}{H_{fft}} f_d\right) \quad (23)$$

$(n_\theta = 0, 1, \ldots, N_\theta - 1)$ $(l = 0, 1, \ldots, M_{fft} - 1)$ $(f_d = 0, 1, \ldots, H_{fft} - 1)$ $(n_{Rx} = 0, 1, \ldots, N_{Rx} - 1)$ The frequency-domain converting unit 9 outputs the signal $R(n_\theta, n_{Rx}, f_d, l)$ based on the correlated range and Doppler frequency to the candidate target detecting unit 10.

The candidate target detecting unit 10 detects a candidate for the target from the signal $R(n_\theta, n_{Rx}, f_d, l)$ based on the correlated range and Doppler frequency.

The candidate target detecting unit 10 can use, for example, a Cell Average Constant False Alarm Rate (CA-CFAR) process as a process of detecting a candidate target.

The candidate target detecting unit 10 outputs the candidate angle-of-arrival number $n_\theta'$, the velocity bin number $f_d'$, and the sampling number l' in the range direction of the detected candidate for the target to the relative value calculating unit 11.

The relative value calculating unit 11 calculates the relative velocity $v'_{tgt}$ of the candidate target on the basis of the velocity bin number $f_d'$ outputted from the candidate target detecting unit 10, as shown in the following equation (24):

$$v'_{tgt} = \frac{c}{2 f_0} f_d' \quad (24)$$

The relative value calculating unit 11 calculates the relative range $R'_{tgt}$ of the candidate target on the basis of the sampling number l' in the range direction which is outputted from the candidate target detecting unit 10, as shown in the following equation (25):

$$R'_{tgt} = l' \Delta r_{IFFT} \quad (25)$$

In equation (25), $\Delta r_{IFFT}$ is a correlated sampling interval in the range direction.

The relative value calculating unit 11 outputs each of the angle of arrival $\theta'(n_\theta')$ from the candidate target corresponding to the candidate angle-of-arrival number $n_\theta'$ of the candidate for the target, the relative velocity $v'_{tgt}$ of the candidate target, and the relative range $R'_{tgt}$ of the candidate target to the display 12.

The display 12 displays each of the angle of arrival $\theta'(n_\theta')$ from the candidate target, the relative velocity $v'_{tgt}$ of the candidate target, and the relative range $R'_{tgt}$ of the candidate target which are outputted from the relative value calculating unit 11 on a screen.

In the above-described first embodiment, the radar device is configured in such a manner that each of the transmission radars 1-1 to 1-$N_{Tx}$ uses, as the amount of phase modulation $\Delta\phi(n_{Tx}, h)$, a value determined from either one of a positive integer value that is less than or equal to a result of division obtained by dividing the number of hits of a transmission RF signal by the number $N_{Tx}$ of the transmission radars 1-1 to 1-$N_{Tx}$ and a value of 0; the hit number h of the transmission RF signal; and the number of hits H. Therefore, the radar device can use the entire frequency range not including aliased Doppler frequency, as a frequency range used to detect a candidate target.

Second Embodiment

In the radar device of the first embodiment, an example in which a single reception radar 4-1 is provided is shown.

In a second embodiment, a radar device including a plurality of reception radars 4-$n_{Rx}$ will be described.

Figure 19:
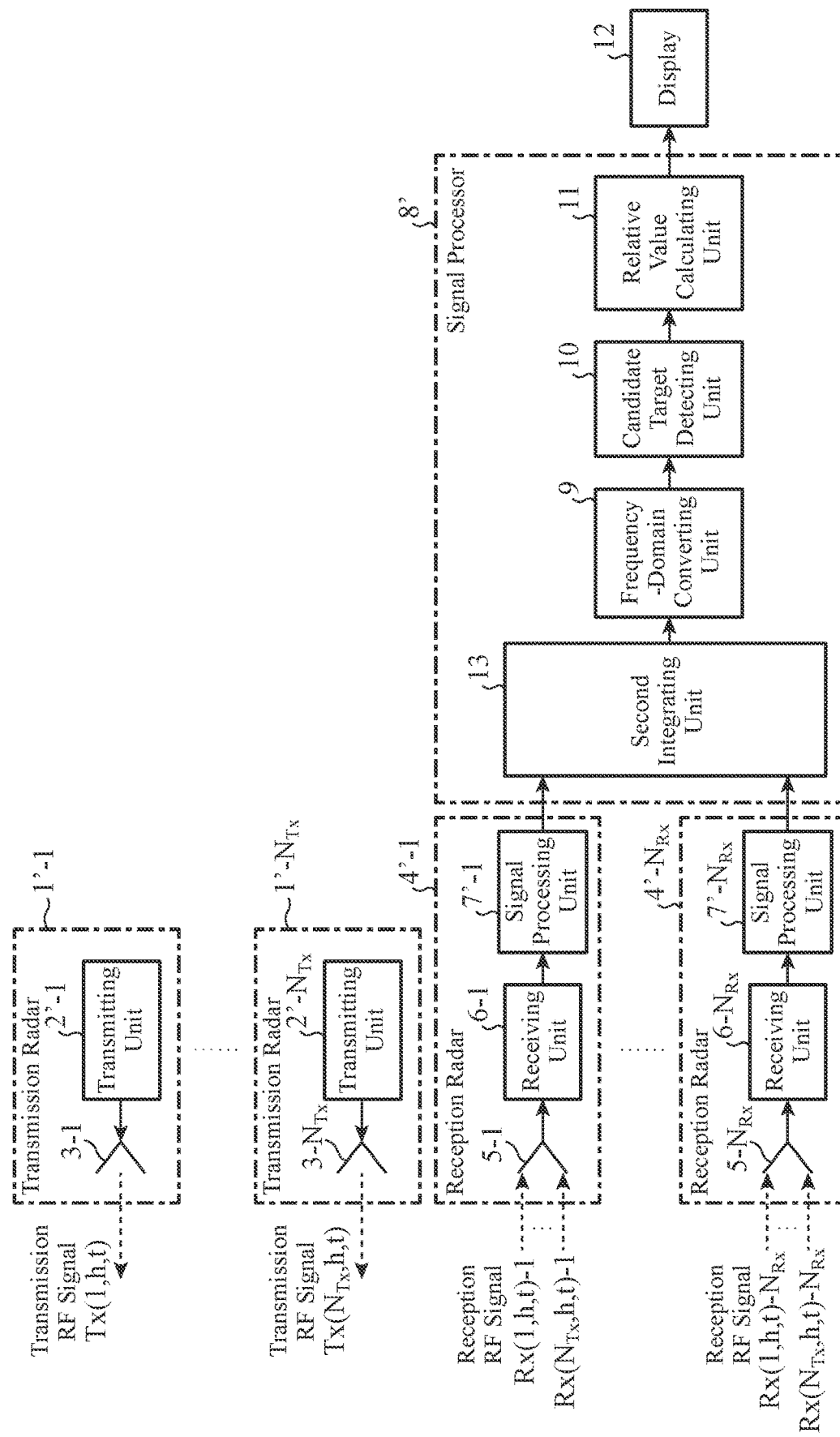
FIG. 19 is a configuration diagram showing a radar device of a second embodiment.

FIG. 19 is a configuration diagram showing a radar device of the second embodiment.

Figure 20:
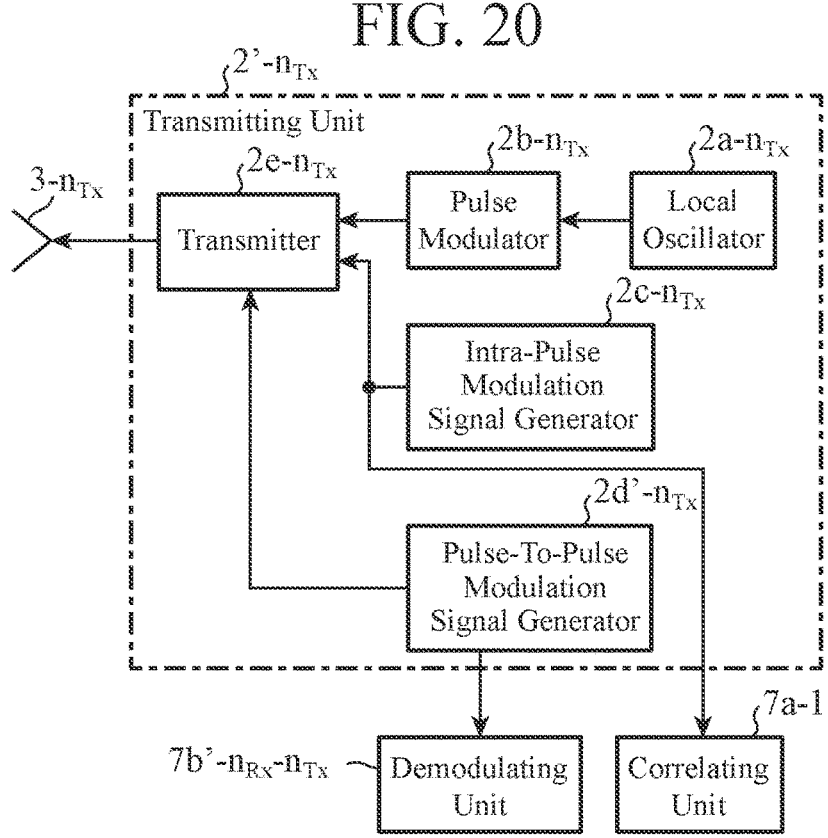
FIG. 20 is a configuration diagram showing a transmitting unit 2'-$n_{Tx}$ of a transmission radar 1'-$n_{Tx}$ in the radar device of the second embodiment.

FIG. 20 is a configuration diagram showing a transmitting unit 2'-$n_{Tx}$ of a transmission radar 1'-$n_{Tx}$ in the radar device of the second embodiment.

Figure 21:
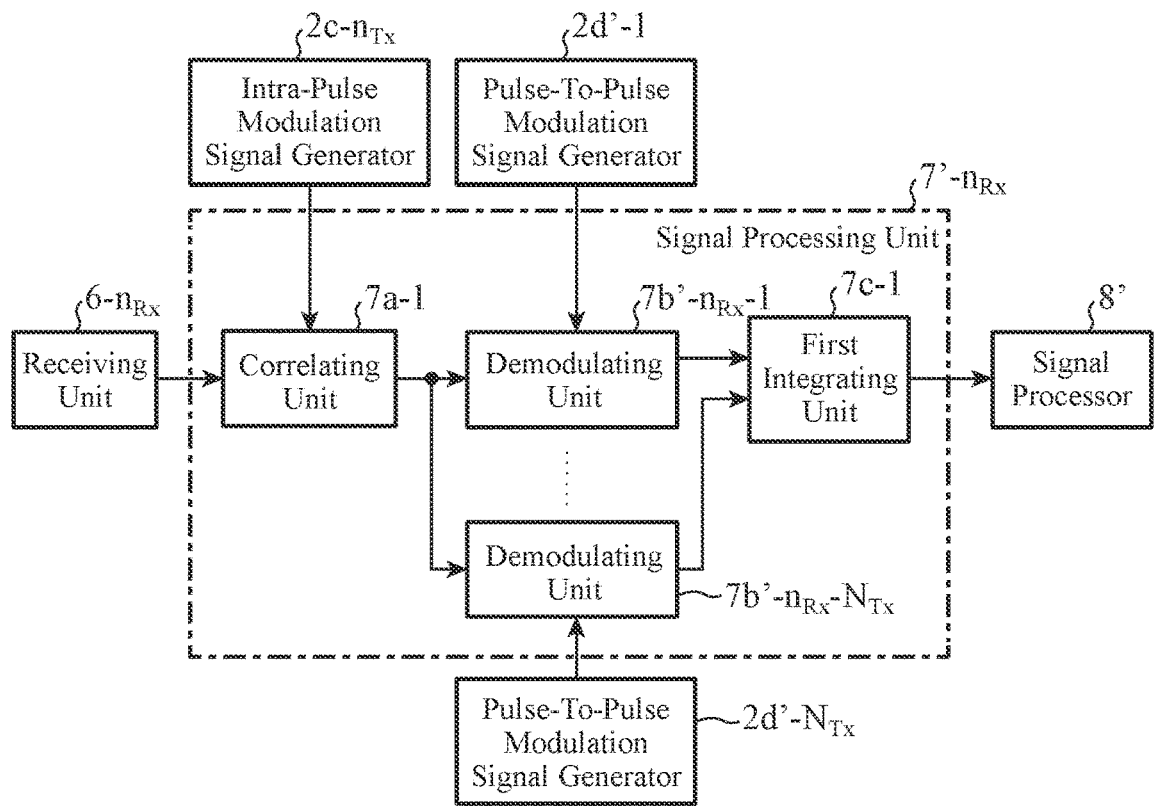
FIG. 21 is a configuration diagram showing a signal processing unit 7'-$n_{Rx}$ of a reception radar 4'-$n_{Rx}$ in the radar device of the second embodiment.

FIG. 21 is a configuration diagram showing a signal processing unit 7'-$n_{Rx}$ of a reception radar 4'-$n_{Rx}$ in the radar device of the second embodiment.

Figure 22:
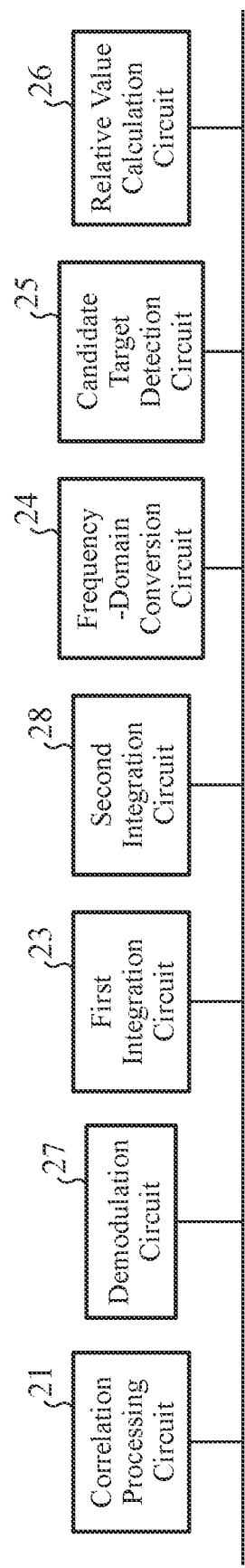
FIG. 22 is a hardware configuration diagram showing the signal processing unit 7'-$n_{Rx}$ and a signal processor 8'.

FIG. 22 is a hardware configuration diagram showing the signal processing unit 7'-$n_{Rx}$ and a signal processor 8'.

In FIGS. 19 to 22, the same reference signs as those in FIGS. 1, 2, 4, and 5 indicate the same or corresponding portions and thus description thereof is omitted.

In FIGS. 19 to 22, the radar device includes transmission radars 1'-1 to 1'-$N_{Tx}$, reception radars 4'-1 to 4'-$N_{Rx}$, the signal processor 8', and a display 12.

A transmission radar 1'-$n_{Tx}$ includes a transmitting unit 2'-$n_{Tx}$ and an antenna 3-$n_{Tx}$.

The transmitting unit 2'-$n_{Tx}$ includes a local oscillator 2a-$n_{Tx}$, a pulse modulator 2b-$n_{Tx}$, an intra-pulse modulation signal generator 2c-$n_{Tx}$, a pulse-to-pulse modulation signal generator 2d'-$n_{Tx}$, and a transmitter 2e-$n_{Tx}$.

As with the pulse-to-pulse modulation signal generator 2d-$n_{Tx}$ shown in FIG. 2, the pulse-to-pulse modulation signal generator 2d'-$n_{Tx}$ generates a pulse-to-pulse modulation signal $L_{hit}(n_{Tx}, h)$, using the amount of phase modulation $\Delta\phi(n_{Tx}, h)$ which varies between hit numbers.

Note, however, that the amount of phase modulation $\Delta\phi(n_{Tx}, h)$ used by the pulse-to-pulse modulation signal generator 2d'-$n_{Tx}$ differs from the amount of phase modulation $\Delta\phi(n_{Tx}, h)$ used by the pulse-to-pulse modulation signal generator 2d-$n_{Tx}$ shown in FIG. 2 in that $P(n_{Tx})$ used for calculation is subjected to a constraint.

The pulse-to-pulse modulation signal generator 2d'-$n_{Tx}$ outputs the pulse-to-pulse modulation signal $L_{hit}(n_{Tx}, h)$ to each of the transmitter 2e-$n_{Tx}$ and corresponding demodulating units 7b'-$n_{Rx}$-$n_{Tx}$.

A reception radar 4'-$n_{Rx}$ ($n_{Rx}$=1, 2, . . . , $N_{Rx}$) includes an antenna 5-1, a receiving unit 6-$n_{Rx}$, and a signal processing unit 7'-$n_{Rx}$.

The signal processing unit 7'-$n_{Rx}$ includes a correlating unit 7a-1, demodulating units 7b'-$n_{Rx}$-1 to 7b'-$n_{Rx}$-$N_{Tx}$, and a first integrating unit 7c-1.

Each of the demodulating units 7b'-$n_{Rx}$-1 to 7b'-$n_{Rx}$-$N_{Tx}$ is implemented by, for example, a demodulation circuit 27 shown in FIG. 22.

A demodulating unit 7b'-$n_{Rx}$-$n_{Tx}$ demodulates a signal $R_{PC}(n_{Rx}, h, l)$ based on the correlated range, using a pulse-to-pulse modulation signal $L_{hit}(n_{Tx}, h)$ outputted from a pulse-to-pulse modulation signal generator 2d'-$n_{Tx}$ of a transmission radar 1-$n_{Tx}$.

The demodulating unit 7b'-1-$n_{Tx}$ outputs a demodulated signal $R_{DEM}(n_{Tx}, n_{Rx}, h, l)$ which is the demodulated signal based on the correlated range to the first integrating unit 7c-1.

A second integrating unit 13 is implemented by, for example, a second integration circuit 28 shown in FIG. 22.

The second integrating unit 13 integrates each of demodulated signals $R_{\Sigma Tx}(n_\theta, n_{Rx}, h, l)$ integrated by the first integrating units 7c-1 included in the reception radars 4'-1 to 4'-$N_{Rx}$, using candidate angles of arrival from the target $\theta'(n_\theta)$.

The second integrating unit 13 outputs the integrated demodulated signal $R_{\Sigma TX, Rx}(n_\theta, h, l)$ to a frequency-domain converting unit 9.

Next, the operation of the radar device shown in FIG. 19 will be described. Note, however, that different portions from the radar device shown in FIG. 1 will be described.

As with the pulse-to-pulse modulation signal generator 2d-$n_{Tx}$ shown in FIG. 2, the pulse-to-pulse modulation signal generator 2d'-$n_{Tx}$ generates a pulse-to-pulse modulation signal $L_{hit}(n_{Tx}, h)$ for performing phase modulation on a pulse signal $L_{pls}(h, t)$, using the amount of phase modulation $\Delta\phi(n_{Tx}, h)$.

Note, however, that the amount of phase modulation $\Delta\phi(n_{Tx}, h)$ used by the pulse-to-pulse modulation signal generator 2d'-$n_{Tx}$ differs from the amount of phase modulation $\Delta\phi(n_{Tx}, h)$ used by the pulse-to-pulse modulation signal generator 2d-$n_{Tx}$ shown in FIG. 2 in that $P(n_{Tx})$ used for calculation is subjected to a constraint.

The P-bar ($n_{Tx}$) subjected to a constraint is represented by the following equations (26) and (27). In text in the specification, since the symbol "–" cannot be added on top of the letter P due to electronic filing, it is written as "P-bar ($n_{Tx}$)".

$$\bar{p}(n_{Tx}) = \text{LARGE}[p(n_{Tx})]$$

$$(n_{Tx}=1,2,\ldots,N_{Tx}) \tag{26}$$

$$\Delta\bar{p}(n_{Tx}) = |\bar{p}(n_*+1) - \bar{p}(n_{Tx})| = 2^{n_x-1}$$

$$(n_{Tx}=1,2,\ldots,N_{Tx}-1) \tag{27}$$

In equation (26), LARGE[•] is an operator that sorts values in the brackets in ascending order.

The constraint for $P(n_{Tx})$ is that "differences between values obtained when each of the pulse-to-pulse modulation signal generators 2d'-$n_{Tx}$ included in the transmitting units 2'-1 to 2'-$n_{Tx}$ sorts different P-bars ($n_{Tx}$) in ascending order take different power-of-two values".

The amount of phase modulation $\Delta\phi(n_{Tx}, h)$ used by the pulse-to-pulse modulation signal generator 2d'-$n_{Tx}$ is represented by the following equation (28):

$$\Delta\varphi(n_{Tx}, h) = 2\pi \frac{\bar{p}(n_{Tx})}{H} h \tag{28}$$

The pulse-to-pulse modulation signal generator $2d'$-$n_{Tx}$ outputs the pulse-to-pulse modulation signal $L_{hit}(n_{Tx}, h)$ to each of the transmitter $2e$-$n_{Tx}$ and corresponding demodulating units $7b'$-$n_{Rx}$-$n_{Tx}$.

The demodulating units $7b'$-$n_{Rx}$-$n_{Tx}$ included in the signal processing units $7'$-1 to $7'$-$n_{Rx}$ each demodulate a signal $R_{PC}(n_{Rx}, h, l)$ based on the correlated range, using the pulse-to-pulse modulation signal $L_{hit}(n_{Tx}, h)$ outputted from the pulse-to-pulse modulation signal generator $2d'$-$n_{Tx}$.

The demodulating unit $7b'$-$n_{Rx}$-$n_{Tx}$ outputs a demodulated signal $R_{DEM}(n_{Tx}, n_{Rx}, h, l)$ which is the demodulated signal based on the correlated range to the first integrating unit $7c$-1.

Figure 23A:
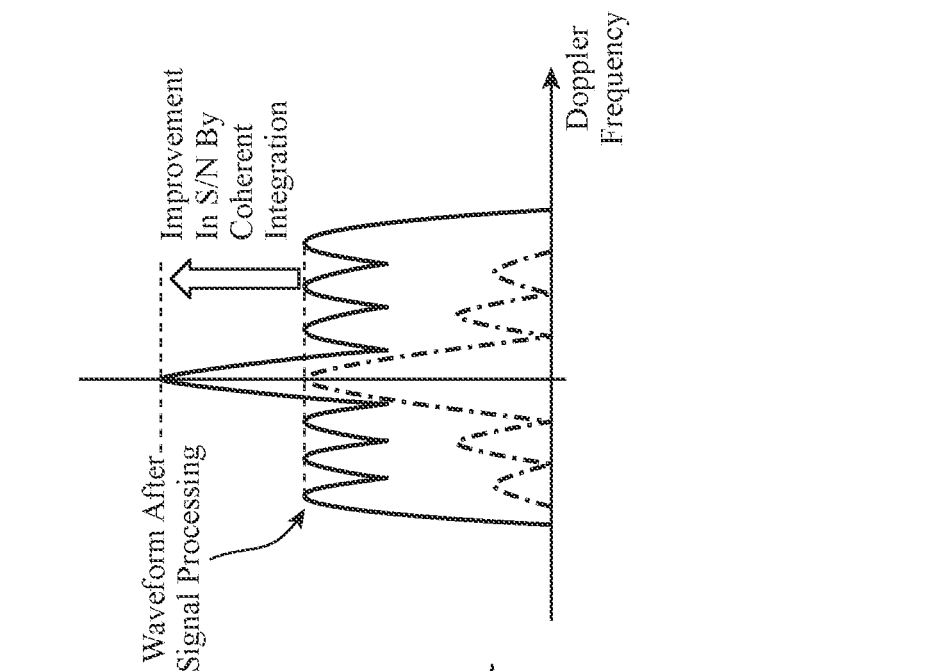
FIG. 23A is an illustrative diagram showing the waveforms of demodulated signals of reception RF signals obtained when a pulse-to-pulse modulation signal generator 2d'-$n_{Tx}$ calculates the amount of phase modulation $\Delta\varphi(n_{Tx}, h)$ using a P-bar ($n_{Tx}$) subjected to a constraint.

FIG. 23A is an illustrative diagram showing the waveforms of demodulated signals of reception RF signals obtained when the pulse-to-pulse modulation signal generator $2d'$-$n_{Tx}$ calculates the amount of phase modulation $\Delta\phi(n_{Tx}, h)$, using the P-bar ($n_{Tx}$) subjected to the constraint.

Figure 23B:
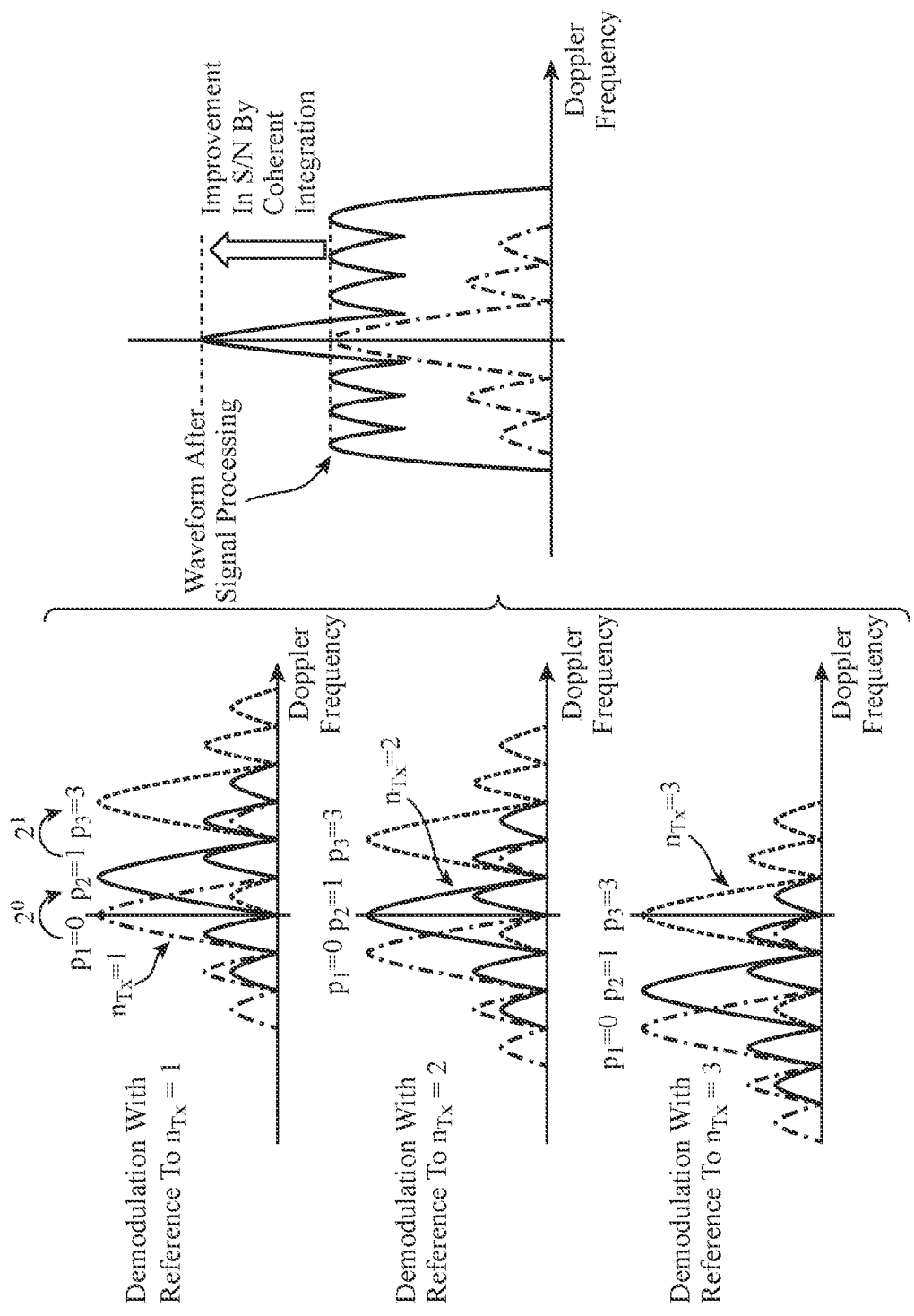
FIG. 23B is an illustrative diagram showing the waveform of a signal obtained by integrating each demodulated signal.

FIG. 23B is an illustrative diagram showing the waveform of a signal obtained by integrating each demodulated signal.

Figure 24A:
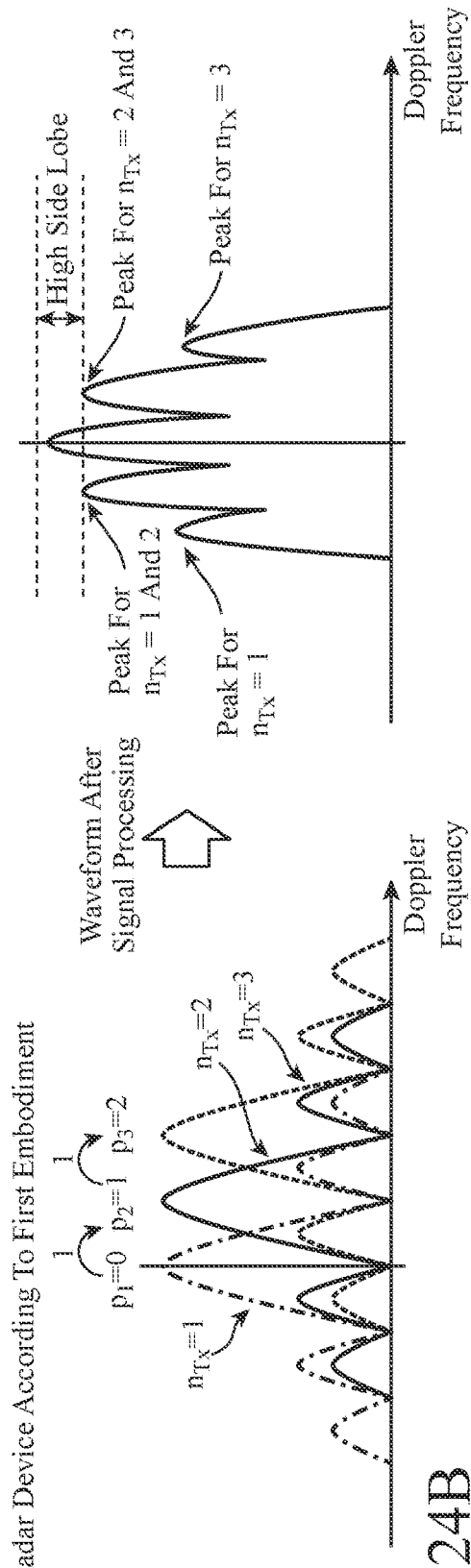
FIG. 24A is an illustrative diagram showing the waveform of a demodulated signal having been subjected to an integration process by the first integrating unit 7c-1 in the radar device shown in FIG. 1.

FIG. 24A is an illustrative diagram showing the waveform of a demodulated signal having been subjected to an integration process by first integrating unit $7c$-1 in the radar device shown in FIG. 1.

Figure 24B:
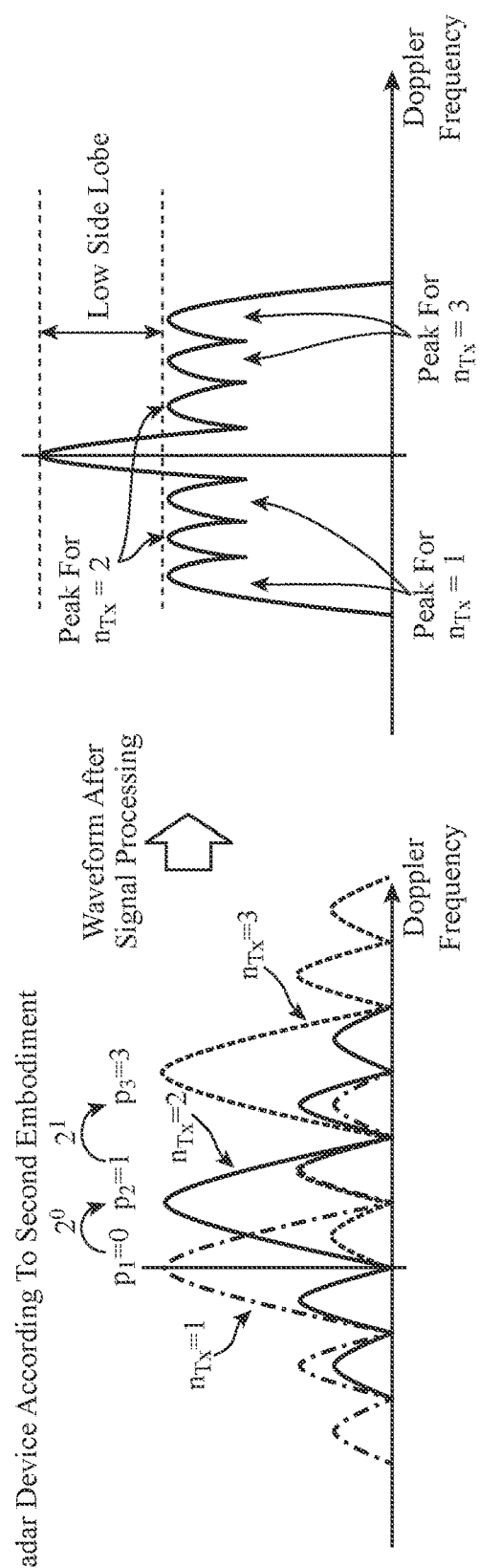
FIG. 24B is an illustrative diagram showing the waveform of a demodulated signal having been subjected to an integration process by a first integrating unit 7c-1 in the radar device shown in FIG. 19.

FIG. 24B is an illustrative diagram showing the waveform of a demodulated signal having been subjected to an integration process by first integrating unit $7c$-1 in the radar device shown in FIG. 19.

In the radar device shown in FIG. 1, as shown in FIG. 24A, the demodulated signal having been subjected to an integration process includes a target peak signal for transmission RF signals with $n_{Tx}=1$ and 2 and a target peak signal for transmission RF signals with $n_{Tx}=2$ and 3, in addition to a peak of Doppler frequency corresponding to the target.

Therefore, a high side lobe waveform appears near the peak of Doppler frequency corresponding to the target.

In the radar device shown in FIG. 19, as shown in FIG. 24B, the demodulated signal having been subjected to an integration process includes a peak of Doppler frequency corresponding to the target, but does not include target peak signals, and thus has low side lobe in a direction of Doppler frequency.

Figure 25:
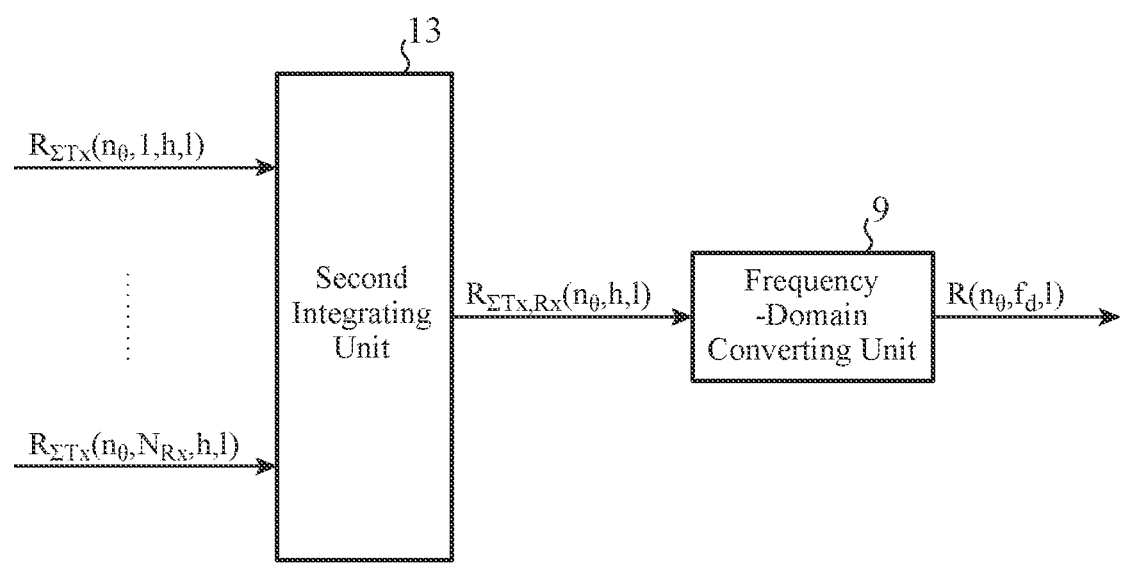
FIG. 25 is an illustrative diagram showing an input-output relationship between a second integrating unit 13 and a frequency-domain converting unit 9.

FIG. 25 is an illustrative diagram showing an input-output relationship between the second integrating unit 13 and the frequency-domain converting unit 9.

The second integrating unit 13 integrates each of demodulated signals $R_{\Sigma Tx}(n_\theta, n_{Rx}, h, l)$ integrated by the first integrating units $7c$-1 included in the reception radars $4'$-1 to $N_{Rx}$, using candidate angles of arrival from the target $\theta'(n_\theta)$.

A demodulated signal $R_{\Sigma Tx, Rx}(n_\theta, h, l)$ integrated by the second integrating unit 13 is represented by the following equation (29):

$$R_{\Sigma Tx, Rx}(n_\theta, h, l) = \sum_{n_{Rx}=1}^{N_{Rx}} R_{\Sigma Tx}(n_\theta, n_{Rx}, h, l) \exp\left(j2\pi f_0 \frac{d_{Rx}(n_{Rx})\sin \theta'(n_\theta)}{c}\right) \quad (29)$$

$(n_\theta = 0, 1, \ldots, N_\theta - 1)$ $(l = 0, 1, \ldots, M_{ffl} - 1)$ $(h = 0, 1, \ldots, H - 1)$ When $\theta=\theta'(n_\theta)$, the demodulated signals $R_{\Sigma Tx}(n_\theta, n_{Rx}, h, l)$ are coherently integrated for each reception radar $4$-$n_{Rx}$, and thus, a demodulated signal $R_{\Sigma Tx, Rx}(n_\theta, h, l)$ having been subjected to integration by the second integrating unit 13 exhibits a maximum value.

The second integrating unit 13 outputs the integrated demodulated signal $R_{\Sigma Tx, Rx}(n_\theta, h, l)$ to the frequency-domain converting unit 9.

In the radar device shown in FIG. 19, the second integrating unit 13 integrates each of demodulated signals $R_{\Sigma Tx}(n_\theta, n_{Rx}, h, l)$ integrated by the first integrating units $7c$-1 included in the reception radars $4'$-1 to $N_{Rx}$, by which the power of the demodulated signals increases and the antenna aperture length virtually increases.

In the radar device shown in FIG. 19, since the power of the demodulated signals increases, detection performance improves, and since the antenna aperture length virtually increases, angular resolution improves.

The frequency-domain converting unit 9 converts the integrated demodulated signal $R_{\Sigma Tx, Rx}(n_\theta, h, l)$ outputted from the second integrating unit 13 into a frequency-domain signal, and thereby generates a signal $R(n_\theta, f_d, l)$ based on the correlated range and Doppler frequency, as the frequency-domain signal.

The signal $R(n_\theta, f_d, l)$ is represented by the following equation (30):

$$R(n_\theta, f_d, l) = \sum_{h=0}^{H-1} R_{\Sigma Tx, Rx}(n_\theta, h, l) \exp\left(-j2\pi \frac{h}{H_{ffl}} f_d\right) \quad (30)$$

$(n_\theta = 0, 1, \ldots, N_\theta - 1)$ $(l = 0, 1, \ldots, M_{ffl} - 1)$ $(f_d = 0, 1, \ldots, H_{ffl} - 1)$ The frequency-domain converting unit 9 outputs the signal $R(n_\theta, f_d, l)$ based on the correlated range and Doppler frequency to a candidate target detecting unit 10.

In the above-described second embodiment, the radar device is configured in such a manner that the reception radars $4$-1 to $4$-$N_{Rx}$ are provided, and the signal processor $8'$ includes the second integrating unit 13 that integrates each of demodulated signals integrated by the first integrating units $7c$-1 included in the reception radars $4$-1 to $4$-$N_{Rx}$, using candidate angles of arrival from a target. Therefore, in the radar device, since the power of demodulated signals increases, detection performance improves. In addition, in the radar device, since the antenna aperture length virtually increases, angular resolution improves.

Third Embodiment

In the radar devices of the first and second embodiments, an example is shown in which the radar devices include the intra-pulse modulation signal generator $2c$-$n_{Tx}$ that generates an intra-pulse modulation signal $L_{chp}(h, t)$ using a frequency modulation bandwidth $B(h)$.

A third embodiment describes a radar device further including a modulation bandwidth setting unit 14 that sets a frequency modulation bandwidth $B(h)$ which varies between hit numbers h, and outputs the frequency modulation bandwidth $B(h)$ to an intra-pulse modulation signal generator $2c''$-$n_{Tx}$.

Figure 26:
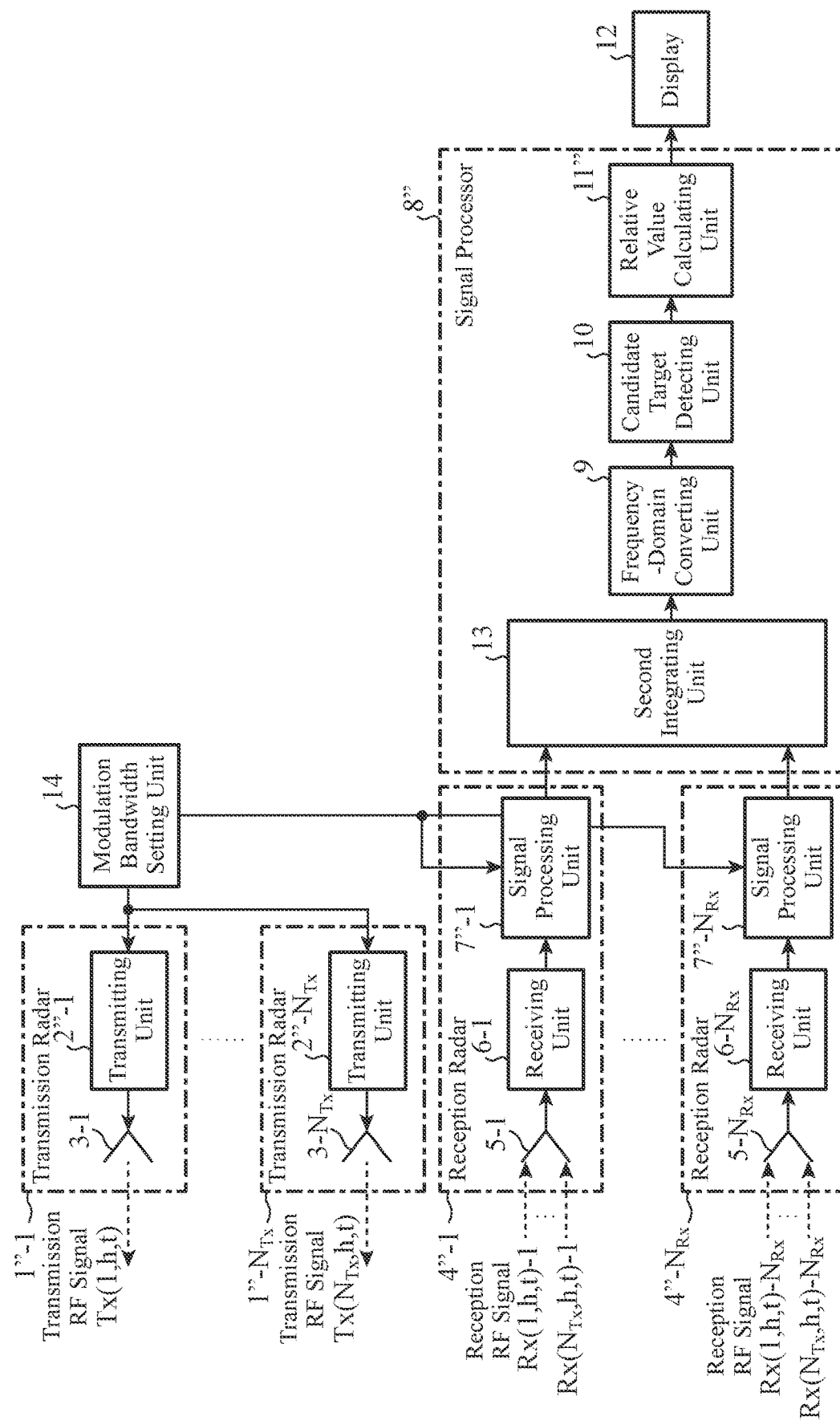
FIG. 26 is a configuration diagram showing a radar device of a third embodiment.

FIG. 26 is a configuration diagram showing a radar device of the third embodiment.

Figure 27:
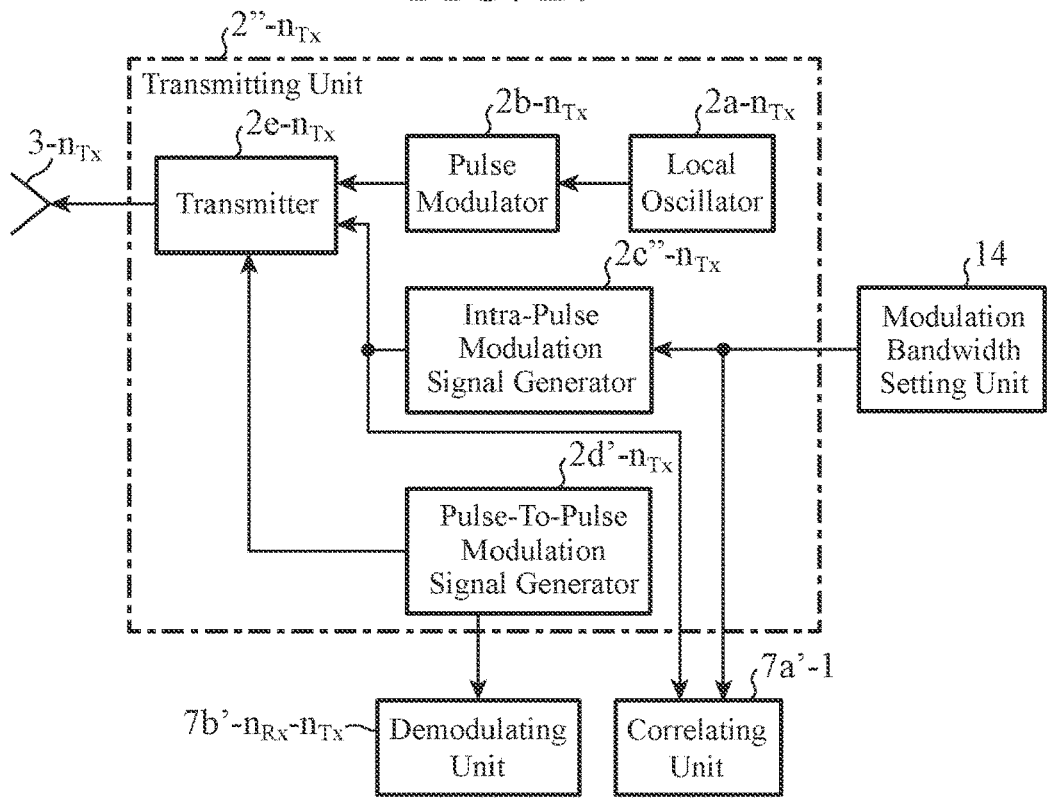
FIG. 27 is a configuration diagram showing a transmitting unit 2"-$n_{Tx}$ of a transmission radar 1"-$n_{Tx}$ in the radar device of the third embodiment.

FIG. 27 is a configuration diagram showing a transmitting unit 2"-$n_{Tx}$ of a transmission radar 1"-$n_{Tx}$ in the radar device of the third embodiment.

Figure 28:
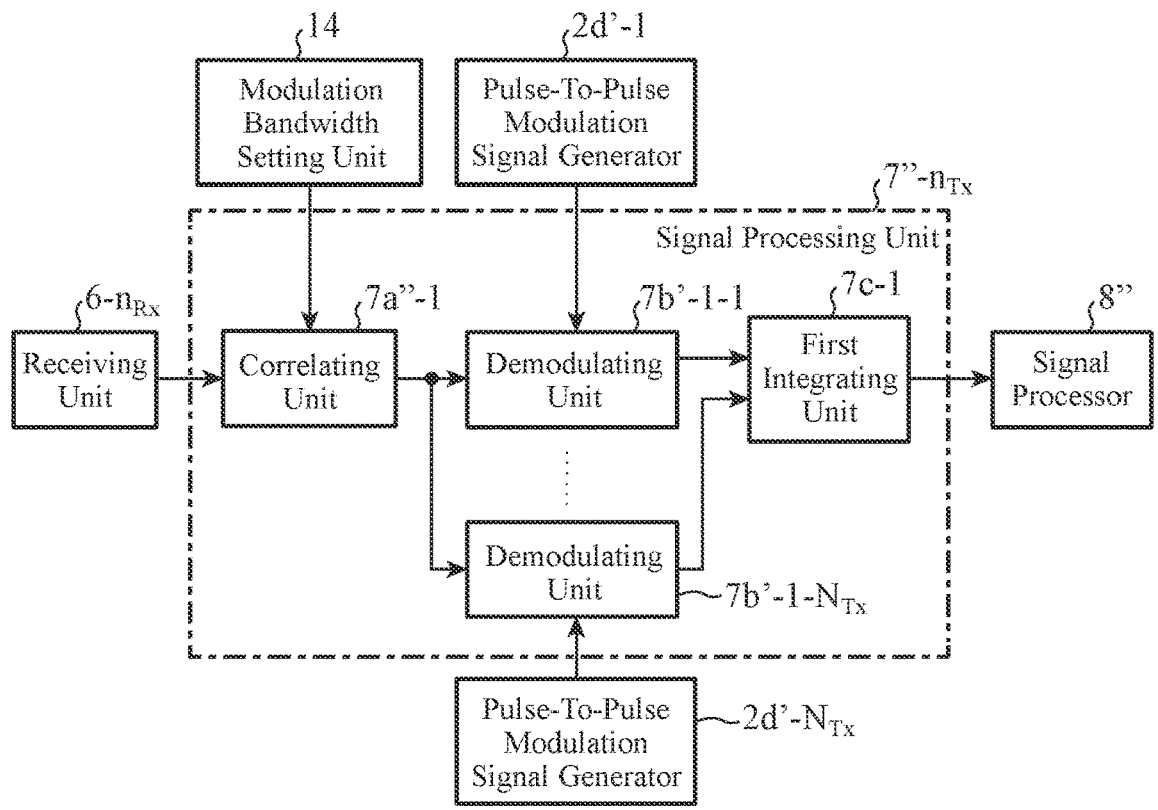
FIG. 28 is a configuration diagram showing a signal processing unit 7"-$n_{Rx}$ of a reception radar 4"-$n_{Rx}$ in the radar device of the third embodiment.

FIG. 28 is a configuration diagram showing a signal processing unit 7"-$n_{Rx}$ of a reception radar 4"-$n_{Rx}$ in the radar device of the third embodiment.

A hardware configuration diagram showing the signal processing unit 7"-$n_{Rx}$ and a signal processor 8" is shown in FIG. 22 as in the second embodiment.

In FIGS. 26 to 28, the same reference signs as those in FIGS. 1, 2, 4, and 19 to 21 indicate the same or corresponding portions and thus description thereof is omitted.

The modulation bandwidth setting unit 14 sets a frequency modulation bandwidth B(h) which varies between hit numbers h, and outputs the frequency modulation bandwidth B(h) to each of an intra-pulse modulation signal generator 2c"-$n_{Tx}$ and a correlating unit 7a"-1.

The modulation bandwidth setting unit 14 can change a chirp direction by switching between the signs of the frequency modulation bandwidth B(h) in the middle of hitting.

The intra-pulse modulation signal generator 2c"-$n_{Tx}$ generates an intra-pulse modulation signal $L_{chp}$(h, t) using the frequency modulation bandwidth B(h) outputted from the modulation bandwidth setting unit 14.

The intra-pulse modulation signal generator 2c"-$n_{Tx}$ outputs the intra-pulse modulation signal $L_{chp}$(h, t) to each of a transmitter 2e-$n_{Tx}$ and the correlating unit 7a"-1.

The correlating unit 7a"-1 is implemented by, for example, a correlation processing circuit 21 shown in FIG. 22.

The correlating unit 7a"-1 performs a correlation process between a reception video signal V($n_{Rx}$, h, m) outputted from an A/D converter 6b-$n_{Tx}$ and a reference signal Ex(h, m) based on the intra-pulse modulation signal $L_{chp}$(h, t), using the modulation bandwidth B(h) outputted from the modulation bandwidth setting unit 14.

A relative value calculating unit 11" is implemented by, for example, a relative value calculation circuit 26 shown in FIG. 22.

The relative value calculating unit 11" calculates the relative velocity $v'_{tgt}$ of a candidate target on the basis of a velocity bin number $f_d'$ outputted from a candidate target detecting unit 10.

In addition, the relative value calculating unit 11" calculates the velocity v of a moving target from a correlated integration location which is detected by the relative value calculating unit 11".

The relative value calculating unit 11" calculates the relative range $R'_{tgt}$ of the candidate target corresponding to a sampling number l' in the range direction which is outputted from the candidate target detecting unit 10.

The relative value calculating unit 11" outputs each of the angle of arrival $θ'(n_θ')$ of the candidate target corresponding to a candidate angle-of-arrival number $n_θ'$ outputted from the candidate target detecting unit 10, and the relative velocity $v'_{tgt}$ and the relative range $R'_{tgt}$ of the candidate target to a display 12.

Next, the operation of the radar device shown in FIG. 26 will be described. Note, however, that different portions from the radar devices shown in FIGS. 1 and 19 will be described.

The modulation bandwidth setting unit 14 sets a frequency modulation bandwidth B(h) which varies between hit numbers h, as shown in the following equation (31):

$$B(h) = \frac{B_0 f_0 T_0}{T_0 f_0 \mp B_0 h T_{pri}} \quad (31)$$

$$(h = 0, 1, \ldots, H - 1)$$

In text in the specification, since the "upside down "±" symbol" cannot be written, the "upside down "±" symbol" is written as "upside down "±"" below.

In equation (31), when the upside down "±" symbol is −, it indicates an up chirp, and when the upside down "±" symbol is +, it indicates a down chirp.

$B_0$ represents the initial value of the modulation bandwidth.

The modulation bandwidth setting unit 14 outputs the frequency modulation bandwidth B(h) to each of an intra-pulse modulation signal generator 2c"-$n_{Tx}$ and a correlating unit 7a"-1.

Figure 29:
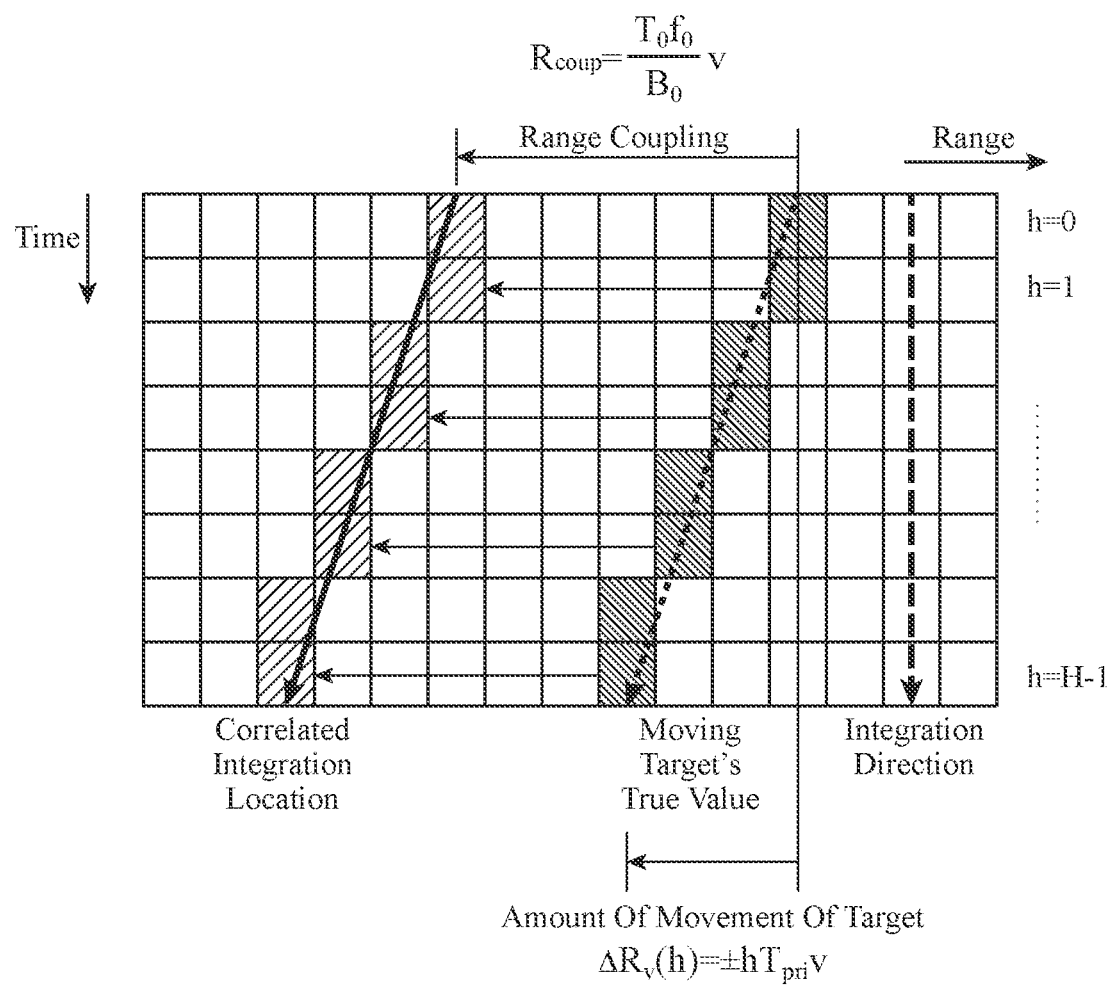
FIG. 29 is an illustrative diagram showing a shift in the range of a moving target, the amount of range coupling, and a correlated integration location in the case where a frequency modulation bandwidth B(h) is fixed.

Here, FIG. 29 is an illustrative diagram showing a shift in the range of a moving target, the amount of range coupling, and a correlated integration location in the case where the frequency modulation bandwidth B(h) is fixed. A target that is moving may be hereinafter referred to as "moving target".

Figure 30:
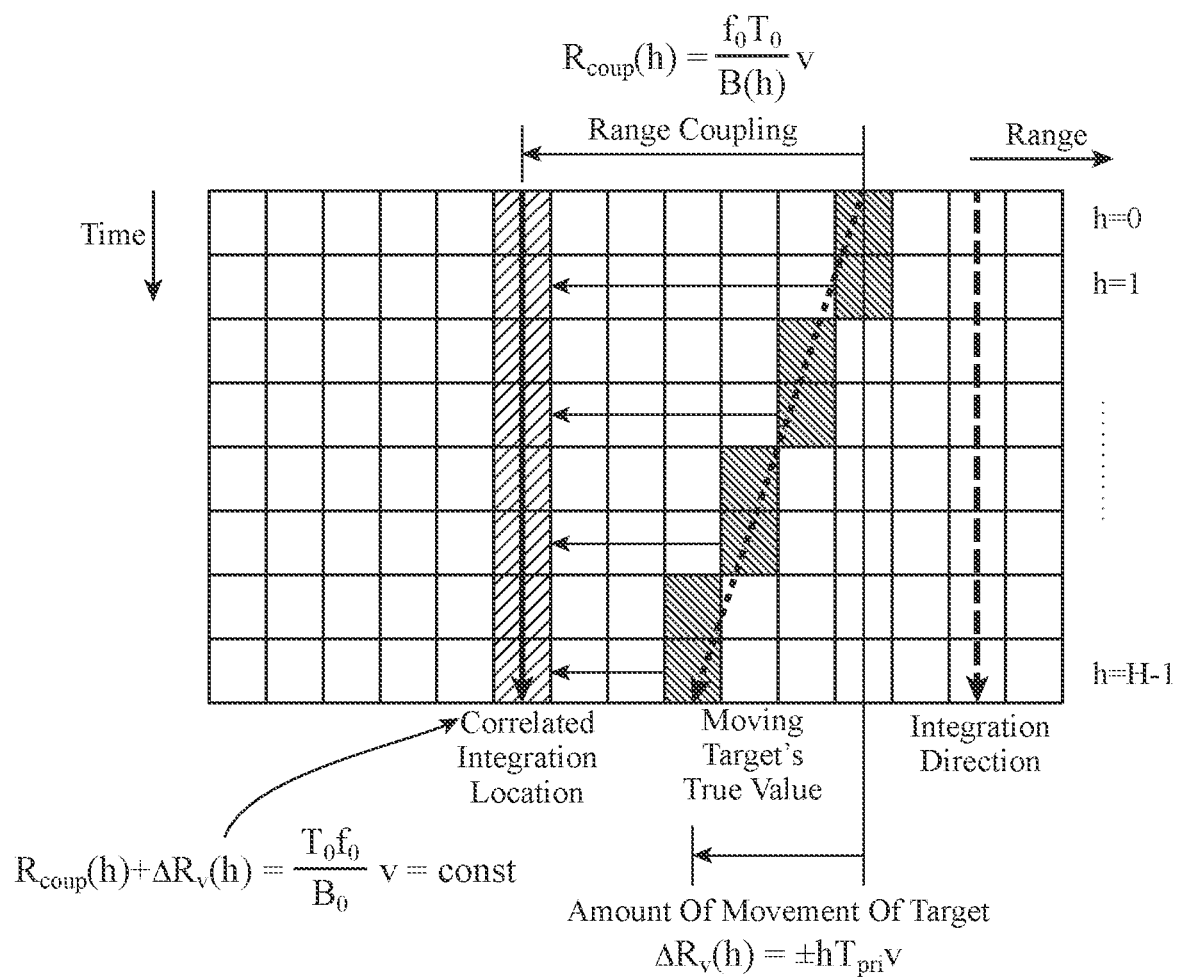
FIG. 30 is an illustrative diagram showing a shift in the range of a moving target, the amount of range coupling, and a correlated integration location in the case where the frequency modulation bandwidth B(h) changes every hit.

FIG. 30 is an illustrative diagram showing a shift in the range of a moving target, the amount of range coupling, and a correlated integration location in the case where the frequency modulation bandwidth B(h) changes every hit.

Figure 31:
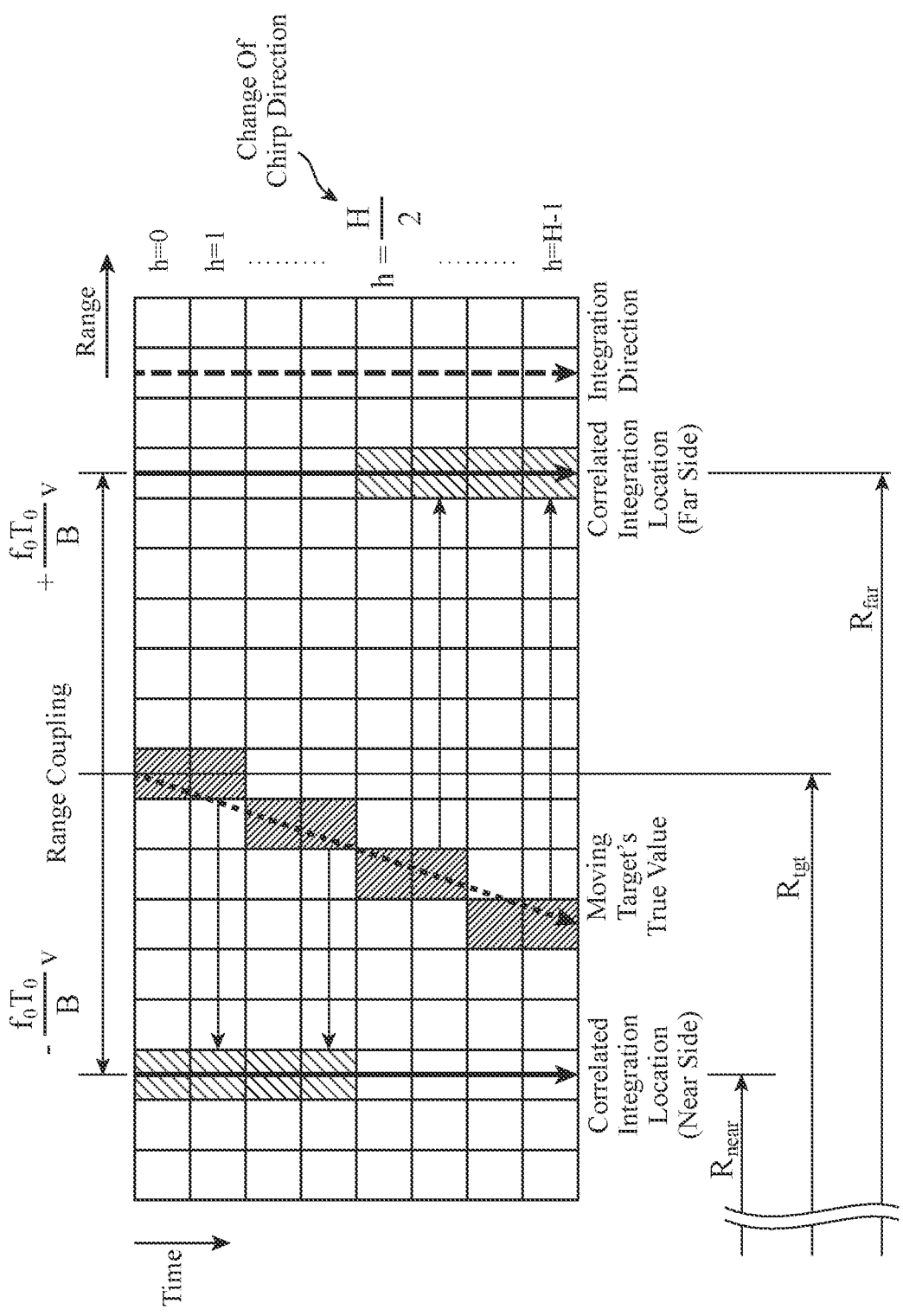
FIG. 31 is an illustrative diagram showing a shift in the range of a moving target, the amount of range coupling, and a correlated integration location in the case where the frequency modulation bandwidth B(h) changes every hit and a chirp direction changes in the middle of hitting.

FIG. 31 is an illustrative diagram showing a shift in the range of a moving target, the amount of range coupling, and a correlated integration location in the case where the frequency modulation bandwidth B(h) changes every hit and the chirp direction changes in the middle of hitting.

With reference to FIGS. 29, 30, and 31, advantageous effects provided by the modulation bandwidth setting unit 14 setting a frequency modulation bandwidth B(h) which varies between hit numbers h will be described below.

FIG. 29 shows a relationship between a moving target's true value of a moving target, an integration location having been subjected to correlation by the first integrating unit 7c-1, and an integration direction in the case where the same frequency modulation bandwidth B(h) is used for all hits.

When the moving target is a high-velocity moving target that is moving at a high velocity, a range between hits changes by $ΔR_v$(h) shown in the following equation (32):

$$ΔR_v(h) = \pm h T_{pri} v$$

$$(h=0,1,\ldots,H-1) \quad (32)$$

Since the range between hits changes by $ΔR_v$(h), as shown in FIG. 29, the moving target does not stay in the same range bin.

Therefore, in a radar device with a fixed frequency modulation bandwidth B(h), a direction indicating changes in integration location having been subjected to correlation by the first integrating unit 7c-1 differs from the integration direction, and thus, integration loss occurs.

In addition, in the radar device with a fixed frequency modulation bandwidth B(h), in a correlation process, the amount of range coupling $R_{coup}$ shown in the following equation (33) occurs in the correlated integration location obtained when a linear chirp signal is used, due to the influence of the velocity of the moving target. The amount of range coupling $R_{coup}$ is the amount of shift in the location of the moving target occurring when a correlation process is performed using a linear chirp signal.

$$R_{coup} = \frac{T_0 f_0}{B_0} v \quad (33)$$

FIG. 30 shows a relationship between a moving target's true value of a moving target, an integration location having been subjected to correlation by the first integrating unit 7c-1, and an integration direction in the case where the modulation bandwidth setting unit 14 changes the frequency modulation bandwidth B(h) every hit.

The amount of range coupling $R_{coup}(h)$ for each hit number h is represented by the following equation (34) and varies between hits:

$$\begin{aligned} R_{coup}(h) &= \frac{T_0 f_0}{B(h)} v \\ &= \frac{(T_0 f_0 \mp B_0 h T_{pri})}{B_0} v \\ &= \frac{T_0 f_0}{B_0} v \mp h T_{pri} v \\ &= \frac{T_0 f_0}{B_0} v \mp \Delta R_{coup} \end{aligned} \quad (34)$$

A total of the amount of range coupling $R_{coup}(h)$ for each hit number h and a shift in a range between hits FIG. $R_v(h)$ is represented as shown in the following equation (35) and is constant:

$$R_{coup}(h) + \Delta R_v(h) = \frac{T_0 f_0}{B_0} v = const \quad (35)$$

Therefore, in the radar device whose frequency modulation bandwidth B(h) is changed every hit by the modulation bandwidth setting unit 14, when a target is making a linear motion with a constant velocity, a direction indicating changes in correlated integration location and the integration direction are identical, and thus, the occurrence of integration loss can be avoided.

The modulation bandwidth setting unit 14 can change the chirp direction by switching between the signs of the frequency modulation bandwidth B(h) in the middle of hitting.

FIG. 31 shows a relationship between a moving target's true value of a moving target, a correlated integration location, and an integration direction in the case where the modulation bandwidth setting unit 14 changes the frequency modulation bandwidth B(h) every hit and changes the chirp direction in the middle of hitting.

When the chirp direction is changed in the middle of hitting, an integration location having been subjected to correlation by the first integrating unit 7c-1 appears in a location $R_{near}$ on a side near the moving target's true value shown in the following equation (36) and a location $R_{far}$ on a side far from the moving target's true value shown in the following equation (37):

$$R_{near} = R_{tgt} - \frac{f_0 T_0}{B_0} v \quad (36)$$

$$R_{far} = R_{tgt} + \frac{f_0 T_0}{B_0} v \quad (37)$$

In equations (35) and (36), $R_{tgt}$ is the range of the moving target's true value at the start of integration.

When each of the location $R_{near}$ on the near side and the location $R_{far}$ on the far side is detected as a correlated integration location, the range $R_{tgt}$ of the moving target's true value at the start of integration can be calculated by the relative value calculating unit 11" as shown in the following equation (38).

In addition, when each of the location $R_{near}$ on the near side and the location far on the far side is detected as a correlated integration location, the velocity v of the moving target can be calculated by the relative value calculating unit 11" as shown in the following equation (39):

$$R_{tgt} = \frac{R_{far} + R_{near}}{2} \quad (38)$$

$$v = \frac{B_0}{2 f_0 T_0} \frac{(R_{far} - R_{near})}{2} \quad (39)$$

The intra-pulse modulation signal generator $2c"\text{-}n_{Tx}$ generates an intra-pulse modulation signal $L_{chp}(h, t)$ using the frequency modulation bandwidth B(h) outputted from the modulation bandwidth setting unit 14, as shown in the following equation (40):

$$L_{chp}(h, t) = \begin{cases} A_L \exp\left(\pm j 2\pi \frac{B(h)}{2 T_0} t^2\right), & h T_{pri} \le t < h T_{pri} + T_0 \\ 0, & \text{otherwise} \end{cases} \quad (40)$$

$$(h = 0, 1, \ldots, H-1)$$

The intra-pulse modulation signal generator $2c"\text{-}n_{Tx}$ outputs the intra-pulse modulation signal $L_{chp}(h, t)$ to each of the transmitter $2e\text{-}n_{Tx}$ and the correlating unit $7a"\text{-}1$.

The correlating unit $7a"\text{-}1$ performs an FFT on a reference signal Ex(h, m) based on the intra-pulse modulation signal $L_{chp}(h, t)$ which is represented by the following equation (41), using the frequency modulation bandwidth B(h) outputted from the modulation bandwidth setting unit 14:

$$Ex(h, m) = \begin{cases} A_E \exp\left(j 2\pi \left(\pm \frac{B(h)}{2 T_0} m^2 \Delta t^2\right)\right), \\ 0 \le m \Delta t \le T_0 \\ 0, \text{otherwise} \end{cases} \quad (41)$$

$$(m = 0, 1, \ldots, M)$$

$$(h = 0, 1, \ldots, H-1)$$

The correlating unit $7a"\text{-}1$ is the same in process as the correlating units $7a\text{-}1$ shown in FIGS. 4 and 21 except that an FFT is performed on the reference signal Ex(h, m) based on the intra-pulse modulation signal $L_{chp}(h, t)$ which is represented by equation (41).

In the above-described third embodiment, the radar device is configured in such a manner that the radar device includes the modulation bandwidth setting unit 14 that sets a frequency modulation bandwidth which varies between hit numbers, and the intra-pulse modulation signal generator $2c"\text{-}n_{Tx}$ generates an intra-pulse modulation signal using the frequency modulation bandwidth set by the modulation bandwidth setting unit 14. Therefore, the radar device can not only obtain the same advantageous effects as those obtained by the radar devices of the first and second embodiments, but also avoid the occurrence of integration loss, improving target detection performance.

In addition, in the third embodiment, the radar device is configured in such a manner that the modulation bandwidth setting unit 14 switches between the signs of the frequency modulation bandwidth in the middle of hitting. Therefore, in the radar device, the amount of movement of a moving target in the range and the amount of range coupling by a correlation process are canceled out, and thus, it becomes possible to further avoid the occurrence of integration loss, improving target detection performance.

Note that in the invention of the present application, a free combination of the embodiments, modifications to any component of the embodiments, or omissions of any component in the embodiments are possible within the scope of the invention.

INDUSTRIAL APPLICABILITY

The invention is suitable for a radar device that detects a candidate for a target.

REFERENCE SIGNS LIST

1-1 to 1-$N_{Tx}$, 1'-1 to 1'-$N_{Tx}$: transmission radar, 2-1 to 2-$N_{Tx}$, 2'-1 to 2'-$N_{Tx}$: transmitting unit, 2a-$n_{Tx}$: local oscillator, 2b-$n_{Tx}$: pulse modulator, 2c-$n_{Tx}$, 2c"-$n_{Tx}$: intra-pulse modulation signal generator, 2d-$n_{Tx}$, 2d'-$n_{Tx}$: pulse-to-pulse modulation signal generator, 2e-$n_{Tx}$: transmitter, 3-1 to 3-$N_{Tx}$: antenna, 4-1, 4'-1 to 4'-$N_{Rx}$: reception radar, 5-1: antenna, 6-1: receiving unit, 6a-1: receiver, 6b-1: A/D converter, 7-1, 7'-1 to 7'-$N_{Rx}$: signal processing unit, 7a-1, 7a"-1: correlating unit, 7b-1-1 to 7b-1-$N_{Tx}$, 7b'-1-1 to 7b'-1-$N_{Tx}$: demodulating unit, 7c-1: first integrating unit, 8, 8': signal processor, 9: frequency-domain converting unit, 10: candidate target detecting unit, 11, 11": relative value calculating unit, 12: display, 13: second integrating unit, 14: modulation bandwidth setting unit, 21: correlation processing circuit, 22, 27: demodulation circuit, 23: first integration circuit, 24: frequency-domain conversion circuit, 25: candidate target detection circuit, 26: relative value calculation circuit, 28: second integration circuit, 31: memory, and 32: processor.

The invention claimed is:

1. A radar device comprising:
a plurality of transmission radars to transmit transmission radio-frequency signals by performing phase modulation on pulse signals with a same transmission frequency, using amounts of phase modulation, the transmission radio-frequency signals being the phase-modulated pulse signals, and the amounts of phase modulation varying between hit numbers;
a reception radar to receive, as a reception radio-frequency signal, each of the transmission radio-frequency signals having been transmitted from each of the plurality of transmission radars, and then reflected by a target; and
a signal processor to detect a candidate for the target on a basis of the reception radio-frequency signal received by the reception radar, wherein
each of the plurality of transmission radars uses, as a corresponding one of the amounts of phase modulation ($\Delta\phi(n_{Tx},h)$):
a value determined from either one of a positive integer value ($P(n_{Tx})$) that is less than or equal to a result of division and a value of 0, where $n_{Tx}$ is an identifier;
a hit number (h); and
a number of hits (H) of a corresponding one of the transmission radio-frequency signals,
the result of division being obtained by dividing the number of hits (H) by a number of the plurality of transmission radars ($N_{Tx}$), the value referring to different amounts of the phase modulation satisfying a formula below:

$$\Delta\varphi(n_{Tx}, h) = 2\pi \frac{p(n_{Tx})}{H} h$$

$$\left( p(n_{Tx}) \in \left\{ 0, 1, \ldots, \text{floor}\left(\frac{H}{N_{Tx}}\right) \right\} \right)$$

2. The radar device according to claim 1, wherein each of the plurality of transmission radars includes:
an intra-pulse modulation signal generator to generate an intra-pulse modulation signal for performing frequency modulation on a corresponding one of the pulse signals, using a frequency modulation bandwidth;
a pulse-to-pulse modulation signal generator to generate a pulse-to-pulse modulation signal for performing phase modulation on the corresponding one of the pulse signals, using a corresponding one of the amounts of phase modulation; and
a transmitter to generate a corresponding one of the transmission radio-frequency signals by multiplying the corresponding one of the pulse signals by the intra-pulse modulation signal generated by the intra-pulse modulation signal generator and the pulse-to-pulse modulation signal generated by the pulse-to-pulse modulation signal generator, and transmitting the corresponding one of the transmission radio-frequency signals.

3. The radar device according to claim 2, wherein the reception radar includes:
a receiver to receive, as a reception radio-frequency signal, each of the transmission radio-frequency signals having been transmitted from each of the plurality of transmission radars, and then reflected by a target;
a correlator to calculate signal strength signals each indicating signal strength corresponding to a hit number and a range from the reception radar, by performing a correlation process between the reception radio-frequency signal received by the receiver and a reference signal based on an intra-pulse modulation signal generated by any one of the intra-pulse modulation signal generators included in the plurality of transmission radars;
a plurality of demodulators each to demodulate a corresponding one of the signal strength signals calculated by the correlator, using a corresponding one of the pulse-to-pulse modulation signals generated by the pulse-to-pulse modulation signal generators included in the plurality of transmission radars, and outputting a demodulated signal, the demodulated signal being the demodulated signal strength signal; and
a first integrator to integrate the demodulated signals outputted from each of the plurality of demodulators, using candidate angles of arrival from the target, wherein
the first integrator outputs the integrated demodulated signal to the signal processor, as the reception radio-frequency signal received by the reception radar.

4. The radar device according to claim 3, wherein the signal processor includes:

a frequency-domain converter to convert the demodulated signal integrated by the first integrator into a frequency-domain signal; and a candidate target detector to detect a candidate for the target from the frequency-domain signal having been subjected to the conversion by the frequency-domain converter.

5. The radar device according to claim 4, wherein the candidate target detector outputs each of a velocity bin number of the detected candidate for the target and a sampling number in a range direction of the detected candidate for the target, and the signal processor includes:

a relative value calculator to calculate a relative velocity of the candidate for the target on a basis of the velocity bin number outputted from the candidate target detector, and calculating a relative range of the candidate for the target on a basis of the sampling number in the range direction outputted from the candidate target detector.

6. The radar device according to claim 3, wherein a plurality of reception radars are provided, and the signal processor includes:

a second integrator to integrate each of demodulated signals integrated by the first integrators included in the plurality of reception radars, using candidate angles of arrival from a target;

a frequency-domain converter to convert the demodulated signal integrated by the second integrator into a frequency-domain signal; and a candidate target detector to detect a candidate for the target from the frequency-domain signal having been subjected to the conversion by the frequency-domain converter.

7. The radar device according to claim 2, comprising a modulation bandwidth setter to set a frequency modulation bandwidth that varies between hit numbers, wherein the intra-pulse modulation signal generator generates the intra-pulse modulation signal using the frequency modulation bandwidth set by the modulation bandwidth setter.

8. The radar device according to claim 7, wherein the modulation bandwidth setter switches between signs of the frequency modulation bandwidth in a middle of hitting.

* * * * *